United States Patent
Kulick, III et al.

(10) Patent No.: US 11,359,876 B2
(45) Date of Patent: Jun. 14, 2022

(54) COOLING TOWER SPLASH BAR HANGER AND RELATED ASSEMBLY

(71) Applicant: Brentwood Industries, Inc., Reading, PA (US)

(72) Inventors: Frank M. Kulick, III, Reading, PA (US); Christopher Bowman, Reading, PA (US)

(73) Assignee: BRENTWOOD INDUSTRIES, INC., Reading, PA (US)

( * ) Notice: Subject to any disclaimer, the term of this patent is extended or adjusted under 35 U.S.C. 154(b) by 0 days.

(21) Appl. No.: 17/604,030

(22) PCT Filed: Jul. 18, 2019

(86) PCT No.: PCT/US2019/042399
§ 371 (c)(1),
(2) Date: Oct. 15, 2021

(87) PCT Pub. No.: WO2021/002878
PCT Pub. Date: Jan. 7, 2021

(65) Prior Publication Data
US 2022/0146217 A1      May 12, 2022

Related U.S. Application Data

(60) Provisional application No. 62/869,726, filed on Jul. 2, 2019.

(51) Int. Cl.
*F28F 25/08*       (2006.01)
(52) U.S. Cl.
CPC ........ *F28F 25/082* (2013.01); *F28F 2275/06* (2013.01)
(58) Field of Classification Search
CPC ............................ F28F 25/082; F28F 2275/06
(Continued)

(56) References Cited

U.S. PATENT DOCUMENTS

| | | |
|---|---|---|
| 2,634,959 A | 4/1953 | Cave |
| 2,780,306 A | 2/1957 | Boyle et al. |

(Continued)

FOREIGN PATENT DOCUMENTS

| | | |
|---|---|---|
| AU | 2012200664 A1 | 3/2012 |
| EP | 0899532 A1 | 3/1999 |

(Continued)

OTHER PUBLICATIONS

International Preliminary Report on Patentability for PCT/US19/042399 dated Aug. 12, 2021.

(Continued)

*Primary Examiner* — Charles S Bushey
(74) *Attorney, Agent, or Firm* — Panitch Schwarze Belisario & Nadel LLP

(57) ABSTRACT

A cooling tower splash bar hanger assembly includes a grid comprised of a plurality of wires, including vertical and horizontal wires, defining a plurality of slots. The plurality of vertical wires includes a first vertical wire and a second vertical wire. The plurality of slots includes a first slot. The first slot defines a first slot width. A first splash bar defines a first bar width and is configured for positioning in the first slot supported by one of the plurality of horizontal wires. A second splash bar defines a second bar width. The second splash bar is supported by the one of the plurality of horizontal wires. The first slot width is greater than the first bar width and the second bar width. The first slot width and the first bar width define a size ratio of approximately two to one or greater than two to one.

17 Claims, 11 Drawing Sheets

(58) Field of Classification Search
USPC .................. 261/108, 110, 111, 112.1, 113
See application file for complete search history.

(56) References Cited

U.S. PATENT DOCUMENTS

| | | | |
|---|---|---|---|
| 3,010,706 A | 11/1961 | McWilliams | |
| 3,346,246 A | 10/1967 | Loetel et al. | |
| 3,389,895 A | 6/1968 | Flon | |
| 3,410,057 A | 11/1968 | Lerner | |
| 3,468,521 A | 9/1969 | Furlong et al. | |
| 3,643,931 A * | 2/1972 | Henning | F28F 25/082 261/DIG. 11 |
| 3,647,191 A | 3/1972 | Fordyce | |
| 3,749,381 A | 7/1973 | Furlong et al. | |
| 3,791,634 A | 2/1974 | Phelps | |
| 3,799,516 A * | 3/1974 | Furlong | F28C 1/04 261/DIG. 11 |
| 3,894,127 A | 7/1975 | Fordyce | |
| 3,969,447 A | 7/1976 | Glitsch et al. | |
| 4,020,130 A * | 4/1977 | Ovard | F28F 25/082 261/DIG. 11 |
| 4,052,491 A | 10/1977 | Lefevre | |
| 4,105,724 A | 8/1978 | Talbot | |
| 4,115,484 A | 9/1978 | Saxton | |
| 4,133,851 A | 1/1979 | Ovard | |
| 4,178,333 A | 12/1979 | Shepherd | |
| 4,269,795 A | 5/1981 | Bosman | |
| 4,276,242 A | 6/1981 | Chen et al. | |
| 4,439,378 A | 3/1984 | Ovard | |
| 4,481,154 A | 11/1984 | Gough et al. | |
| 4,515,735 A | 5/1985 | Phelps | |
| 4,557,878 A | 12/1985 | Fulkerson | |
| 4,562,015 A | 12/1985 | Lefevre | |
| 4,575,435 A | 3/1986 | Kuhl | |
| 4,576,764 A | 3/1986 | Shepherd et al. | |
| 4,578,227 A | 3/1986 | Ovard | |
| 4,604,247 A | 8/1986 | Chen et al. | |
| 4,676,934 A | 6/1987 | Seah | |
| 4,705,653 A | 11/1987 | Stackhouse et al. | |
| 4,762,650 A | 8/1988 | Bosman | |
| 4,803,018 A | 2/1989 | Lefevre et al. | |
| 4,868,956 A * | 9/1989 | Shepherd | F28F 25/082 24/336 |
| 4,879,084 A | 11/1989 | Pamigoni | |
| 4,915,877 A | 4/1990 | Shepherd | |
| 4,985,182 A | 1/1991 | Basse et al. | |
| 5,104,588 A | 4/1992 | Kinney, Jr. | |
| 5,112,537 A | 5/1992 | Kinney, Jr. | |
| 5,185,105 A | 2/1993 | Peterson | |
| 5,279,774 A | 1/1994 | Remy et al. | |
| 5,372,752 A | 12/1994 | Bosman | |
| 5,374,381 A | 12/1994 | Schuld et al. | |
| 5,461,761 A | 10/1995 | Knopfli et al. | |
| 6,083,441 A | 7/2000 | Ptaschek et al. | |
| 6,293,527 B1 | 9/2001 | Ovard | |
| 6,511,053 B2 | 1/2003 | Kaibel et al. | |
| 6,877,727 B2 | 4/2005 | Olson et al. | |
| 7,559,541 B2 | 7/2009 | Beltz et al. | |
| 7,618,026 B2 | 11/2009 | Armstrong | |
| 7,669,838 B2 | 3/2010 | North | |
| 8,020,837 B2 | 9/2011 | Byrne, Jr. | |
| 8,827,248 B2 | 9/2014 | Short | |
| 8,926,305 B2 | 1/2015 | Kuchar et al. | |
| 8,960,259 B2 | 2/2015 | Weston | |
| 9,291,395 B2 | 3/2016 | Roth | |
| 9,546,830 B2 | 1/2017 | Krell et al. | |
| 2007/0045879 A1 | 3/2007 | Armstrong | |
| 2007/0176308 A1* | 8/2007 | Shepherd | F28F 25/082 261/DIG. 11 |
| 2015/0014869 A1 | 1/2015 | Roth | |
| 2015/0130094 A1 | 5/2015 | Powell | |
| 2015/0211818 A1 | 7/2015 | Krell et al. | |

FOREIGN PATENT DOCUMENTS

| | | |
|---|---|---|
| EP | 1731220 B1 | 8/2008 |
| EP | 2181833 A1 | 5/2010 |
| GB | 1363416 A | 8/1974 |
| GB | 2192051 A | 12/1987 |

OTHER PUBLICATIONS

International Search Report and Written Opinion for PCT/US19/042399 dated Dec. 11, 2019.

* cited by examiner

COOLING TOWER SPLASH BAR HANGER AND RELATED ASSEMBLY

CROSS REFERENCE TO RELATED APPLICATIONS

The present application is a Section 371 national phase application of International Patent Application No. PCT/US2019/042399, filed Jul. 18, 2019 and titled, "Cooling Tower Splash Bar Hanger and Related Assembly" and claims the benefit of U.S. Provisional Patent Application No. 62/869,726 filed on Jul. 2, 2019 and titled, "Cooling Tower Splash Bar Hanger and Related Assembly" the entire contents of which are incorporated herein by reference in their entirety.

BACKGROUND OF THE INVENTION

Cooling towers are open loop direct contact evaporative heat exchangers used to provide a heat sink, which is air, for a wide variety of waste heat applications. Hot process water or a hot cooling medium is delivered to the cooling tower via nozzles at a top portion of the cooling tower. The water or cooling medium from the nozzles is distributed and cascades over fill media under the force of gravity beneath the nozzles and within the cooling tower. The media is typically described as "fill," which provides surface area and splash surfaces for exposure of the hot process water or other heat transfer medium and a structure for mass transfer to remove heat from the water via air flowing through the fill. Air delivery is typically through natural draft or forced ventilation that typically flows along the length of splash bars, where assembled splash bars comprise the fill, mounted in the cooling tower. Depending on the direction of air flow through the cooling tower with respect to the cooling medium, typically water, the cooling tower may be concurrent (air and water flow in the same downward direction), which is rare due to less turbulent interaction of the air and water, counter-current (water flows downwardly and air flows upwardly), or cross-flow (water flows downwardly and air flows generally horizontally through the medium). Cross-flow current is typical for cooling towers including splash bars mounted therein on splash bar hangers, wherein the installed splash bars comprise the fill.

The tower fill utilized in the cooling tower depends upon the tower application, which varies widely based on many factors. For instance, a splash fill may be used for applications where the water source contains polluted, dirty water, water with solid impurities or any cooling fluid where fouling is expected during use. A number of variations exist for tower fill, including splash fill that relies on the impact of falling water on a surface to provide relatively small water droplets of high surface area to volume ratios. Fill surface area also contributes to the mass transfer capacity of the fill. Splash bars are a variation of splash fill that requires a support system to position the splash bars at predetermined locations in the cooling tower for proper operation. Splash bars are typically longitudinal bars or beams that span structural support members within the cooling tower where the spacing between supports of a typical cooling tower is approximately two feet to five feet (2-5'). Splash bars themselves vary in length and shape, but may include bars having a length of approximately eighteen feet (18') and a width of approximately two to six inches (2-6") for ease of installation in a typical cooling tower.

The splash bars are generally offset both vertically and horizontally by grids that support the splash bars so that water droplets from a water distribution system above the fill fall vertically from near the top of the cooling tower onto the splash bars. The falling water droplets strike the splash bars below the water distribution system, but may also fall between splash bars that are laterally separated by support structure of the cooling tower or those that are misaligned during installation. The hot cooling medium or hot water falls onto top level splash bars and also onto lower level splash bars as droplets from higher splash bars descend through the array of splash bars. Large water droplets are generally broken into smaller water droplets upon striking one of the splash bars. As many water droplets strike the splash bars, a thin film of water tends to form on each splash bar in the cooling tower and the surface area of the thin film of water is exposed to air flowing through the splash bar array, thereby resulting in evaporative cooling. The film of water is also the source of the formation of large droplets on the underside of the splash bars. These droplets break from the surface when the droplet achieves a sufficient size such that the droplet cannot be retained on the surface of the splash bar. For these heat exchange features and mechanisms to occur in the cooling tower, the splash bars are preferably precisely placed and assembled into the cooling tower such that the cooling medium does not fall directly into the lower cooling basin. Prior art splash bar hangers are prone to misplacement and misalignment of splash bars during installation and installation is difficult, particularly when relatively long splash bars are installed into the cooling tower, as the slots or windows for installation are narrow and difficult to visualize for the installer, particularly at a distal end of the cooling tower that is not visible to the installer.

Referring to FIGS. 1PA-3PA, typical prior art splash bar support grids 1, which may be referred to as hanger grids 1, include a mesh of perpendicular wires, including vertical suspension members 2 and horizontal beams 3, that are typically spaced at fixed dimensions of four inches (4") horizontally and four to twelve inches (4-12") vertically to form rectangular slots within which the splash bars 5 are supported on the horizontal beams 3. The horizontal beams 3, therefore, are typically spaced about four to twelve inches (4-12") vertically relative to each other and the vertical support members 2 are typically spaced about four inches (4") horizontally relative to each other. The horizontal beams 3 may have four inch (4") vertical spacing (FIG. 1PA) and a top horizontal beam 3 may be installed at the top of a cooling tower (near the fan in the case of a mechanical-draft tower) to limit excessive localized air velocities and assist in creating an even pressure drop throughout the cooling tower. The horizontal beams 3 having an eight inch (8") vertical spacing (FIG. 2PA) may be installed with a top horizontal beam 3 near, but below the water distribution system. The hanger grids 1 formed by the mesh are generally two to four feet (2-4') in width and four, six, eight, ten or twelve feet (4-12') in height. The hanger grids 1 can be sized to support a fill section where air and water interact within cooling towers of various designs and dimensions. The four inch (4") wide spacing of the vertical support members 2 are particularly difficult for technicians to navigate when installing the splash bars, as the splash bars typically have a width greater than the four inch (4") spacing to prevent vertical gaps where cooling medium may flow directly and vertically through the fill without impacting any of the splash bars. The prior art splash bars typically have notches that receive the vertical support members 2 so that the splash bars lay flat on the horizontal beams 3 in an installed configuration.

Splash bars 5 are typically supported by one of several methods. A first method may utilize the prior art hanger grids 1 with the horizontal beams 3 and vertical suspension members 2 that are spot welded at the crossing points and treated for corrosion resistance. One treated version uses a dipped plastic coating covering hot-dipped galvanized steel wire; however, the vibration and movement of the splash bars 5 within the tower from air flow may cause localized wearing of the coating at contact points between the grid 1 and the splash bars 5, thereby exposing the wires 2, 3 to corrosion and ultimately failure. Most grids 1, including the wires 2, 3, are welded from hot dipped galvanized wire 2, 3 exposing the steel. These welded panels or grids 1 are then coated with polyvinyl chloride ("PVC") resin, which becomes the only feature for preventing corrosion of the wires 2, 3. The exposed wire 2, 3 combined with chemical treatment erodes the zinc coating leading to a similar local degradation of the material and associated failure mechanism. Stainless steel wire mesh or grids 1 may also be used. It would be desirable to design, develop and deploy hangers that provide improved corrosion resistance when compared to the prior art wires.

Plastic injection molded grids 1 are used to provide a similar spacing arrangement and typically have an integrated connection feature (not shown) that is utilized to attach or secure the splash bars 5 to the grid 1. The integrated connection features are molded into either the vertical suspension members 2 or the horizontal beams 3. The plastic grids 1 are generally molded as a single unit of and may have a width of two to four feet (2-4') and a height of four to eight feet (4-8'). The longer lengths are achieved by tying multiple plastic panels together with tie wire or hog rings. The plastic grids 1 tend to fail at areas of high stress near the top of the splash grid hanger as the load from the lower levels is additive upwardly on the grid 1 toward the upper connection to the cooling tower structure. As the load increases, the stress in the vertical suspension members 2 of the grid 1 also increases. The material properties may be exceeded locally near the top of the grids 1 as the stress surpasses the ultimate strength of the material at the design cross-section. The current plastic products attach via holes that are molded into the vertical suspension members 2, which may concentrate stress at these locations of reduced cross-section and, therefore, further reduce the strength of the product. It would be desirable to design, develop and deploy a splash bar hanger that is able to withstand the structural loads encountered by the hanger, specifically near a top of the hanger where it is connected to the cooling tower support structure.

Typical splash bars 5 may be slightly greater in width than the lateral spacing of the vertical suspension member 2 of support grids 1 to eliminate bypass of the cascading water or flow of the water past the splash bars 5 without impacting the splash bars 5. As a result, the splash bars 5 must be rotated on edge for insertion into the hanger grids 1 and may also be rotated for insertion to avoid the pre-molded connection features. Notches punched into one or both edges of the splash bars 5 allow the splash bar 5 to lay flat on the horizontal beams 3 of the hanger grid 1 while encompassing the vertical suspension members 2 of the hanger grid 1. Installation and retention of the splash bars 5 on the horizontal beams 3 is difficult for a technician, because of the required rotation of the splash bars 5 and urging through the relatively small and narrow grid holes during installation, specifically the four inch (4") wide slots. In addition, installation or assembly is difficult because a distal end of the splash bar 5 is spaced from the installer and is not visible to the installer or easy to manipulate during installation. The process of rotating the splash bars 5 in the narrow slots of the hanger grids 1 during installation complicates and increases the time required for installation. In addition, improper installation or placement of the splash bars 5, typically from improper placement of distal ends of the splash bars 5 in the distal grid 1, may create vertical voids within the fill section that permit water to bypass the splash bars 5 and fall under gravity directly into a basin below the splash bars 5. Bypass of the cooling medium past the splash bars 5 and directly into the lower basin is undesirable, as the cooling medium that bypasses the splash bars 5 directly from the water distribution system may have nearly the same temperature at inlet and when the cooling medium falls into the basin, thereby increasing the temperature of the basin cooling medium and reducing efficiency. Specifically, any gaps that are created within the cooling tower due to installation errors of the splash bars 5 or otherwise is undesirable. Horizontal gaps defined in the grid of splash bars 5 mounted to the hanger grids 1 can result in falling water that is continuous from the top of the installed bars 5 to the bottom of the grid of splash bars 5 into the basin. When a slot is defined in the sides of the splash bars 5 to accommodate the vertical suspension members 2 and reduce any gaps in the grid of splash bars 5, the slot interferes with the installation of the bars 5 where the wires of the vertical suspension members 2 gets caught in the slots in the splash bar 5 as it is inserted into the openings, potentially due to awkward or insufficient rotation or orientation of the splash bars 5 during installation by the technician. It would be desirable to design, develop and deploy a splash bar hanger that improves installation accuracy and simplifies installation for the technician.

The splash bars 5 typically have a horizontal width of approximately four inches (4") and are generally placed in a four by eight (4×8) (FIG. 1PA) spacing or arrangement in a cooling tower. The splash bars 5 may also be positioned in eight by eight (8×8) (FIG. 2PA) or twelve by eight (12×8) (FIG. 3PA) arrangements or other arrangements in the cooling tower, depending on the configuration of the cooling tower. The prior art grids 1 and splash bars 5 have the four inch (4") widths, but are also constructed having two inch (2") widths for narrower splash bars. In the case of the four by four (4×4) spacing, the splash bars 5 are typically placed in every other opening horizontally and vertically in the hanger grid 1, wherein the vertical suspension members 2 and the horizontal beams 3 are spaced at four inch (4") intervals. For four by eight (4×8) spacing, the bars 5 are typically placed in every other opening horizontally, but are typically placed in every third opening vertically for the same four by four (4×4) spaced wire. For wire with the four by eight (4×8) spacing, the bars 5 are typically placed in every other opening to achieve the desired offset arrangement. These splash bar arrangements set the spacing to be horizontally offset; however, the vertical suspension members 2 of the hanger grid 1 may interfere with the splash bars 5 and either slots are cut into the edge or the splash bars 5, resulting in horizontal overlap of adjacent splash bars 5 or a gap may be defined between adjacent splash bars 5 at the vertical suspension members 2, thereby allowing for cooling medium bypass of the bars 5 and a lack of redistribution and splashing across the "opening." The hanger grids 1, as is shown in FIGS. 1PA-3PA, may be configured with the vertical suspension members 2 and horizontal beams 3 spaced to define a four by four (4×4) (FIG. 1PA) grid, a four by eight (4×8) (FIG. 2PA) grid or a four by twelve (4×12) (FIG. 3PA) grid, which facilitates different spacing and positioning of the splash bars 5 and the splash bars 5 may be positioned in the four by four (4×4) hanger grid 1 in the 4×8

Arrangement, the 8×8 Arrangement or the 12×8 Arrangement, as is shown in FIGS. 1PA-3PA. The slots in the bars 5 may interfere with the installation of the bars 5 (called punching) where the wire 2, 3 gets caught in one of the slots in the splash bar 5 as it is inserted into the openings in the grids 1 prior to being positioned in the proper assembled position.

When using wire support grids, the splash bars are typically held in place within the slots of the hanger grids 1 by external clips or large staples, generally termed "hog rings" or polymer clips/bench supports. Polymer fill support grids utilize clips integrally molded into the grid. The method of attachment assists with maintaining the splash bars in position and can have an impact on cost due to manpower required to attach the splash bars to the support or grids 1 at every grid location. Commonly, the grids 1 are installed sequentially up to the length of the splash bar. Access to the grids 1 and splash bars is typically difficult from the sides and at the grids 1 that are opposite the insertion side of the fill material. The splash bars are typically inserted from one end and clipped or stapled at the end of the splash bar where the installer has access to the splash bar and the grid 1. This leaves unattached ends of the splash bar at the opposite side of the fill to move freely within the slots of the opposite side grid 1 and may result in the splash bars moving under the force of the lateral and vertical air flow desired for mass transfer, vibrations created during operation of the cooling tower, forces created by the cascading cooling medium or any force that may move the unattached or unsecured ends of the splash bars. This splash bar movement is undesirable, as misalignment and misplacement may create bypass windows or pathways in the fill material and increase the temperature of the basin cooling medium. In cases where access is available to both sides of the splash bars, increased manpower may be used to clip the splash bars 5 at both ends of the grids 1. The splash bars may also be inserted into the hanger grid slots and not clipped or secured on either end.

Two methods are typically employed to secure the hanger grids 1 to the cooling tower structure. A first method utilizes the wire mesh support grids 1, wherein a separate bracket is first fastened to the existing cooling tower support structure using screws or nails. The wire hanger grid 1 is then hung from the bracket, typically by the top horizontal beam 3. The load of multiple panels vertically connected together is then applied to the grid 1 and at spot welds of the top horizontal beam 3, which may result in failure of the welds in overload conditions, such as when ice forms on the fill material. These failures may be exacerbated in cold climates where fouling accumulates on the fill material and on the hanger grids 1 and splash bars in winter or at any time during relatively cold ambient conditions. Injection molded plastic hangers or grids 1 typically feature nail or screw holes in either the top horizontal beams 3 or near the top of the vertical suspension members 2. The same principle of accumulated load of multiple vertically connected panels also applies to the plastic panels or grids 1, which may result in the load surpassing the ultimate strength of the plastic vertical suspension members 2 in unexpected overload conditions.

A significant issue with the prior art hanger grids 1 is the difficulty installing the prior art splash bars 5 into the grids 1. The prior art splash bars 5 take significant time and aggravation to install. Mesh bar fills have become dominant in the industry due to their superior thermal performance and easier installation characteristics. There are a couple of reasons why the labor costs for installation are high. The first is the grid slots of the prior art hanger grids 1 cause the bars 5 to catch on the vertical wire members 2 during installation. The grid slots, defined by the horizontal beams 3 and the vertical wire members 2, are relatively small and narrow, particularly in comparison to the widths of the splash bars 5, as the width of the splash bar 5 is often greater than the width of the slots. For example, inserting an angled eighteen foot (18') long splash bar 5 into a four by four (4×4) grid slots where the width of the splash bar 5 is greater than four inches (4") is difficult for the installer and the slots or notches formed in the side edges of the splash bar 5 often catch on the vertical wire members 2 as the splash bar 5 is urged into the installed position. The second reason why the labor costs for installation are high is that the wire grid hangers 1 are typically designed to a 4-inch width, which is fundamentally the same or smaller than the width of splash bars 5 being installed. The horizontal beams and vertical wire members 2, 3 arranged in 4×8, 8×8, and 12×8 inch configurations allow for only differences in vertical height of the grid slots. Since the bars 5 can be as long as eighteen feet (18'), the installer must thread or urge the bars 5 through the appropriate grid slots in the wire hanger grid 1 with a flexible prior art splash bar 5 that tends to rotate about its neutral or longitudinal axis when supported from one end, such as when the installer grasps the splash bar 5 by one end and urges the bar 5 through multiple slots of multiple hanger grids 1 into the cooling tower. The number of wire grids 1 that must be threaded or punched is determined by the span of the splash bar 5 and the size of the cooling tower.

The foregoing limitations associated with the prior art hanger grids and their assembly are addressed by the various aspects and preferred embodiments of the present invention, including a wire hanger grid for supporting splash bars in a cooling tower and splash bars adapted for use with specific preferred embodiments of the hanger grids, assemblies of the hanger grids with their supported splash bars, a method of assembling the hanger grids and a method of assembling an evaporative cooler fill assembly, including hanger grids and splash bars in a cooling tower. The preferred hanger grids specifically address limitations of the prior art hanger grids 1 regarding difficult and expensive installation requirements for an installer when installing the bars 5 into the grids 1 and proper positioning of the bars 5 into the slots of the grids 1.

BRIEF SUMMARY OF THE INVENTION

Briefly stated, the preferred invention is directed to a cooling tower splash bar hanger for supporting splash bars in a portion of a cooling tower through which air and water flow. The splash bar hanger includes a grid of wires defining a plurality of slots. The plurality of slots includes a first slot with a first bottom portion, a first top portion and a pair of first side portions. The first slot has a closed quadrilateral shape with the first bottom and top portions defining a vertical axis and the pair of first side portions defining a horizontal axis. The grid is configured for mounting to the cooling tower on a grid plane. The first bottom portion is configured to support a first lower portion of a first splash bar of the splash bars in an assembled configuration.

In another aspect, the preferred invention is directed to a cooling tower splash bar hanger for supporting splash bars in a portion of a cooling tower through which air and water flow. The splash bar hanger includes a first grid comprised of a first plurality of wires defining a first plurality of slots. The first plurality of slots includes a first slot with a first bottom portion. The first slot has a quadrilateral shape with a pair of first vertical corners defining a first vertical axis and a pair of first horizontal corners defining a first horizontal axis. The first grid defines a first plane. A second grid is comprised of a second plurality of wires defining a second plurality of slots. The second plurality of slots includes a third slot with a third bottom portion. The third slot has a quadrilateral shape with a pair of third vertical corners defining a third vertical axis and a pair of third horizontal corners defining a third horizontal axis. The second grid defines a second plane. The first plane is substantially parallel relative to the second plane. The first and third slots are substantially aligned along a first splash bar axis that extends generally perpendicular to the first and second planes. The first and second grids are configured to support end portions of a first splash bar at the first and third bottom portions of the first and third slots, respectively, in an assembled configuration.

In an additional aspect, the preferred invention is directed to a cooling tower splash bar hanger assembly for mounting in a cooling tower to cool a cooling medium. The splash bar hanger assembly includes a grid, a first splash bar and a second splash bar. The grid is comprised of a plurality of wires defining a plurality of slots. The plurality of wires includes a plurality of vertical wires and a plurality of horizontal wires. The plurality of vertical wires includes a first vertical wire and a second vertical wire. The plurality of slots includes a first slot that defines a first slot width between the first vertical wire and the second vertical wire. The first splash bar defines a first bar width. The first splash bar is configured for positioning in the first slot in a mounted configuration supported by one of the plurality of horizontal wires. The second splash bar defines a second bar width. The second splash bar is supported by the one of the plurality of horizontal wires in the mounted configuration. The first slot width is greater than the first bar width and the second bar width. The first slot width and the first bar width defining a size ratio. The size ratio being approximately two to one or greater than two to one.

In another aspect, the preferred invention is directed to a cooling tower splash bar hanger for supporting splash bars in a portion of a cooling tower through which air and water flow. The splash bar hanger is comprised of a grid having wires defining a plurality of slots. The plurality of wires includes a plurality of vertical wires and a plurality of horizontal wires. The plurality of horizontal wires includes a first horizontal wire and a second horizontal wire. The first horizontal wire has a first diameter and the second horizontal wire has a second diameter. The first diameter is greater than the second diameter. The plurality of vertical wires are welded to the plurality of horizontal wires to define the grid.

In a further aspect, the preferred invention is directed to a cooling tower splash bar hanger for supporting splash bars in a portion of a cooling tower through which air and water flow. The splash bar hanger is comprised of a grid having wires defining a plurality of slots. The wires include a plurality of generally horizontal wires and a plurality of generally vertical wires. The plurality of generally horizontal wires includes a first generally horizontal wire and a second generally horizontal wire. A first slot is defined between the first generally horizontal wire and the second generally horizontal wire. The grid includes a top support extending generally parallel to the first and second generally horizontal wires. The top support is spaced from the second generally horizontal wire at a top support height. The first generally horizontal wire is spaced from the second generally horizontal wire at a slot height. The slot height is greater than the top support height.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings.

DETAILED DESCRIPTION OF THE INVENTION

Figure 1P:
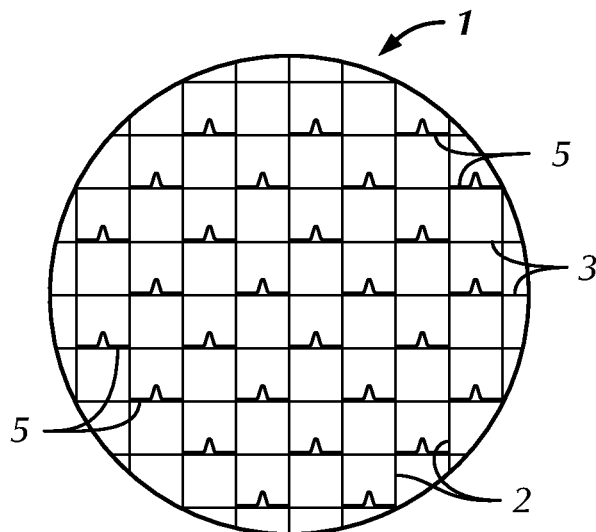
FIG. 1PA is a front elevational view of a prior art hanger grid with assembled splash bars in a four by eight (4×8) arrangement.
Figure 2P:
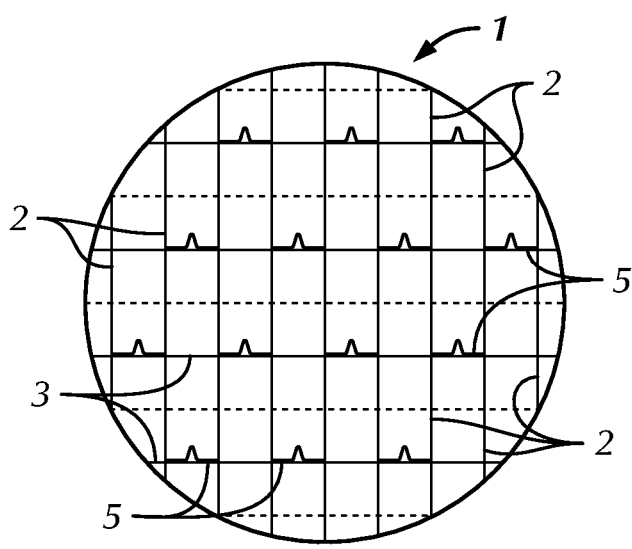
FIG. 2PA is a front elevational view of a prior art hanger grid with assembled splash bars in an eight by eight (8×8) arrangement.
Figure 3P:
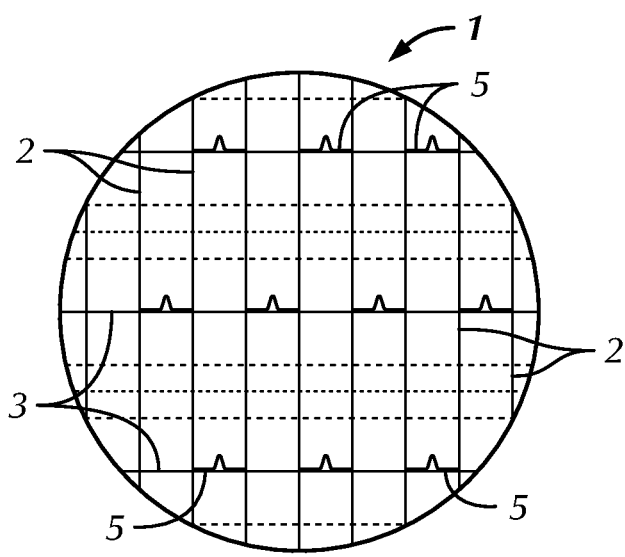
FIG. 3PA is a front elevational view of a prior art hanger grid with assembled splash bars in a twelve by eight (12×8) arrangement.

Certain terminology is used in the following description for convenience only and is not limiting. Unless specifically set forth herein, the terms "a" "an" and "the" are not limited to one element but instead should be read as meaning "at least one". The words "right," "left," "lower," and "upper" designate directions in the drawings to which reference is made. The words "inwardly" or "distally" and "outwardly" or "proximally" refer to directions toward and away from, respectively, the geometric center or orientation of the device and instruments and related parts thereof. The terminology includes the above-listed words, derivatives thereof and words of similar import.

It should also be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally the same or similar, as would be understood by one having ordinary skill in the art. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to FIGS. 1-5A, a cooling tower splash bar hanger assembly of a first preferred embodiment, generally designated 10, includes splash bars 18 that are supported by splash bar hanger grids 14, 14a, 14b. The splash bar hangers 14, 14a, 14b are configured for supporting the splash bars 18 in a cooling tower (not shown) through which air and water flow, preferably in a crossflow or counterflow configuration. The splash bar hangers or grids 14, 14a, 14b of the first preferred embodiment are constructed of a series of wires 12 arranged to define a grid 14 that further defines a plurality of slots or windows 16. The wires 12 described herein may be comprised of the first preferred generally cylindrically-shaped wires 12, otherwise relatively thin structural member or other structural members that are able to perform the general function of the wires 12 in the grids 14, 14a, 14b and withstand the normal operating conditions of the grids 14, 14a, 14b In the first preferred embodiment, the grid 14 is comprised of at least first and second splash bar hangers or grids 14a, 14b mounted on opposite sides of the cooling tower, as will be described in greater detail below, and additional grids (not shown) that are typically positioned intermediate or between the first and second grids 14a, 14b to support the splash bars 18. The intermediate grids are not shown in the drawing for clarity purposes, but provide support for the splash bars 18 along their length and are typically spaced at regular intervals from each other and the first and second grids 14a, 14b. The slots 16 are positioned adjacent to each other and have a quadrilateral, square or substantially diamond shape. The slots 16 are comprised of closed shapes that preferably receive and support one end 18a or a portion of a single splash bar 18 of the splash bars 18 in an assembled configuration and each of the plurality of slots 16 may support one of the end portions 18a of the splash bars 18 or intermediate portions of the splash bars 18. The plurality of the slots 16 includes a first slot 30 that has a first bottom portion 30a, a first top portion 30b and a pair of first side portions 30c. The first slot 30 has a quadrilateral shape with four sides and four corners or peaks 17 with the bottom and top portions 30a, 30b defining a vertical axis 20 and the pair of side portions 30c defining a horizontal axis 22, that preferably extends through the opposing peaks 17. The slots 16 are described herein generically utilizing reference number 16, while the first slot 30 is described herein utilizing reference number 30, although the first slot 30 could be located anywhere in the splash bar grid 14, including on either of the first and second splash bar grids 14a, 14b or any of the intermediate grids, and be comprised of nearly any of the slots 16 in the grids 14. The slots 16 each include a bottom portion 16a.

The splash bar grid 14 is configured for mounting to the cooling tower on a grid plane 24, which includes a first grid plane 24a associated with the first grid 14a and a second grid plane 24b associated with the second grid 14b in the first preferred embodiment, as well as additional grid planes (not shown) associated with the intermediate grids 14. The first bottom portion 30a of the first slot 30 is configured to support a first splash bar 19. A first splash bar lower corner 19b of the first splash bar 19 is preferably positioned proximate the first bottom portion 30a such that the first splash bar 19 is self-aligned based on the shape of the first splash bar 19 and the first slot 30. Each of the splash bars 18 are mounted to the hangers 14a, 14b, 14 such that lower corners 18b are positioned proximate the bottom portions 16a of the slots 16 in an installed configuration. The slots 16 are configured to support the splash bars 18 in the self-aligning fashion. The plurality of slots 16 also includes a second slot 32 with a second bottom portion 32a, a second top portion 32b and a pair of second side portions 32c. One of the pair of first side portions 30c is attached to one of the pair of the second side portions 32c, such that the first slot 30 is attached to and adjacent to the second slot 32 in the grid 14. The second slot 32, similarly, may be located nearly anywhere in the grids 14, 14a, 14b and may comprise any of the slots 16.

The typical method of manufacturing the grids 14, which is generically identified by reference number "14" to indicate either of the first or second grids 14a, 14b or any of the intermediate grids, is to wrap the wires 12 around a mandrel shaped as a blade at a period equal to the twice the width of the mandrel. The formed wires 12 are configured into the grid 14, preferably in the shape of an offset zig-zag that is formed about the mandrel thickness. Individual wires 12 are threaded with adjacent wires 12 to form the collapsible mesh or grid 14 in the quadrilateral, rotated square or diamond-shaped slots 16 when the wires 12 are generally oriented parallel and perpendicular to each other, respectively. The spacing of the wires 12 is preferably constructed such that each of the slots 16 in the grid 14 have a first spacing $S_1$ of approximately four to twelve inches (4-12") and a second spacing $S_2$ of approximately four to twelve inches (4-12"), such that the slots 16 of the first preferred embodiment typically have four inch by four inch (4×4") to twelve inch by twelve inch (12×12") slots 16. In a preferred arrangement of the first preferred embodiment, the slots 16 have first and second spacings $S_1$, $S_2$ of five and two-thirds inches by five and two-thirds inches (5.66×5.66") when the splash bar 18 has a splash bar width $W_B$ of approximately four inches (4"). The first and second spacings $S_1$, $S_2$ are preferably sized and configured based on the bar width $W_B$ of the splash bars 18 such that the droplets that fall through the cooling tower impact at least one of the splash bars 18 at every two vertical levels of splash bars 18 in the cooling tower that are mounted on the first preferred hanger grids 14. A slot width $W_S$ of the slots 16 is preferably, approximately twice or slightly less than twice the bar width $W_B$ such that the splash bars 18 are so impacted by droplets as they fall through the cooling tower. A slot height $H_S$ of the slots 16 is preferably substantially the same as the slot width $W_B$ and, therefore, the slot height $H_S$ is preferably, approximately twice or slightly less than twice the bar width $W_B$. The first slot 30, specifically defines the first spacing $S_1$ between the peak 17 of the first top portion 30*b* and one of the peaks 17 of the pair of first side portions 30*c* and the first and second spacings $S_1$, $S_2$ are preferably the same for each slot 16 in the first preferred embodiment. The preferred wires 12 are constructed of stainless steel, galvanized steel, polyvinyl chloride ("PVC") coated steel, aluminum, aluminum-coated steel, steel or other wire materials that are able to take on the general size and shape of the wires 12, are generally compliant for taking on the size and shape of the grids 14, and withstand the normal operating conditions and manufacturing techniques utilized to form the grids 14. The preferred wires 12 have generally circular cross-sections, but are not so limited and may have other shapes and configurations, such as square, T-shaped, I-beam shaped, U-shape, N-shape, Z-shape, oval, relatively flat, rectangular or rectangular-shaped cross-sections or other structural shapes depending on loading or other factors, as long as the shapes are able to perform the preferred functions of the wires 12 and withstand the normal operating conditions of the wires 12. The wires 12 may particularly have shapes other than generally circular when formed from polymeric materials, such as rectangularly shaped wires 12 formed in an injection molded grid 14.

The preferred invention utilizes the grids 14, 14*a*, 14*b* to support and space the splash bars 18 in a cooling tower. The first preferred embodiment is configured with the first spacing $S_1$ at five and two-thirds inches and the second spacing $S_2$ at five and two-thirds inches, thereby defining slots 16 having eight by eight inch (8×8") slots 16 measured from opposing peaks 17 of each of the slots 16 or having a slot width $W_S$ of eight inches (8") and a slot height $H_S$ of eight inches (8"), preferably in the diamond pattern with the wires 12 constructed of low grade stainless steel with the bar width $W_B$ being approximately four inches (4") in this preferred configuration. The first slot 30, specifically, preferably defines the slot height $H_S$ between the peak 17 of the first bottom portion 32*a* and the peak 17 of the first top portion 30*b*, wherein the dimensions of each of the slots 16, 30, 32 are substantially the same in an individual grid 14. The first slot 30 preferably defines the first slot width $W_S$ between the peaks 17 of the pair of first side portions 30*c*. End portions 18*a* of the splash bars 18 are preferably inserted into the slots 16 and rest or are supported at a bottom portion 16*a* of the diamond-shaped slots 16, along an entire width of the legs of the splash bars 18 that are positioned in the slots 16. Intermediate portions of the splash bars 18 are also preferably supported by the grids 14, based on structural support and design requirements. The bottom portion 16*a* is not limited to providing the support for the splash bar 18, as the splash bar 18 may have a different size and shape than disclosed in the preferred present invention such that portions of the grids 14 spaced from the bottom portion 16*a* support the splash bar 18, such as splash bars 18 having a trapezoidal cross-section, an oval cross-section, a circular cross-section, a round cross-section or other shapes that preferably self-align or self-center when inserted into the slots 16. The preferred slots 16 and splash bars 18 are not limited to the above-described preferred dimensions and may be otherwise designed and configured, such as splash bars 18 constructed having bar widths $W_B$ of approximately two, four, six and eight inches (2", 4", 6" or 8") and slots 16 having first and second spacings $S_1$, $S_2$ of approximately two and eight tenths inches to twelve inches (2.8-12").

The grid 14 and individual slots 16 are oriented such that each of the slots 16 includes opposing peaks 17 generally aligned along the vertical axis 20 and another two opposing peaks 17 are generally aligned along the horizontal axis 22. The grid 14 and slots 16, thereby define a series of diamond shapes in an installed configuration, with the wires 12 preferably defining right angles in each of the slots 16 adjacent the peaks 17. The wires 12 are not limited to defining right angles in each of the slots 16 adjacent the peaks 17 and may be otherwise designed and configured, such as the wires 12 proximate the bottom portions 16*a* or first and second bottom portions 30*a*, 32*a* and first and second top portions 30*b*, 32*b* define acute angles, while the wires 12 proximate the first and second side portions 30*c*, 32*c* define obtuse angles. Such a configuration provides additional strength and stability based on the more vertically oriented wires 12 in the assembled configuration. This preferred configuration with more vertically oriented wires 12 may also be utilized to arrange or define a drop distance between splash bars 18 when mounted in the grids 14 in an assembled configuration.

The diamond shape of the slots 16, defined by the wires 12, preferably self-centers or self-aligns the splash bars 18, thereby setting a bar spacing $S_B$, preferably at approximately five and two-thirds inches (5.66") for splash bars 18 having the four inch (4") bar width $W_B$, wherein the bar spacing $S_B$ is preferably measured from a geometric center C to a geometric center C of the adjacent splash bars 18. The splash bars 18 preferably have a triangular-shaped, preferably an right isosceles triangle shaped, cross-section with a ninety degree (90°) lower corner 18*b* that is positioned into the bottom portion 16*a* of the diamond-shaped slot 16 in the assembled configuration with the lower corner 18*b* positioned adjacent the lowermost peak 17 of each of the slots 16. The bar spacing $S_B$ is not limited to the described dimensions and may be otherwise sized and configured, such as being approximately two and eight tenths to twelve inches (2.8-12"), depending on the size and configuration of the splash bars 18. The splash bars 18 preferably have the bar width $W_B$ of approximately four inches (4"), but are not so limited and may be otherwise sized, such as two to twelve inches (2-12"), that is measured generally parallel to the horizontal axis 22 between horizontal edges of the splash bars 18 in the assembled and installed configuration. In the installed configuration, therefore, when the bars 18 are arranged with their lower corners 18*b* positioned proximate the bottom portions 16*a* of each of the slots 16, wherein the slot width $W_S$ and the slot height $H_S$ are approximately four to sixteen inches (4-16"), the full width of the horizontal portion of the cooling tower along the horizontal axis 22 is covered by one of the splash bars 18, without the vertical pathways created by the vertical suspension members of the prior art splash bar hangers. Water or any other cooling medium falling vertically through the cooling tower, therefore, will typically impact or pass through at least one of the splash bars 18 at every two vertical levels of splash bars 18 when travelling from a top of the cooling tower to the bottom. Specifically, the plurality of slots 16 of the grid 14 is configured to support the splash bars 18 such that the water falling through the cooling tower impacts or falls through at least one of the splash bars 18, because the splash bars 18 fully cover a horizontal space between a grid top 15*a* and a grid bottom 15*b* in the assembled and installed configuration. When mounted in the preferred slots 16 and arranged in the preferred grids 14, the splash bars 18 fully cover the horizontal space in the cooling tower based on the substantially vertical flow or fall of the cooling medium under the force of gravity and, thereby, preferably eliminate potential horizontal gaps in water distribution that may be created between the bars 18, such as if the bars 18 are improperly spaced within the tower or are installed in the tower with the vertical structural support members. The splash bars 18 also preferably self-align when inserted into the slots 16 of the grids 14 without requiring interference or aligning features based on the shape of the slots 16 and the splash bars 18 and the positioning of the grids 14, 14*a*, 14*b* in the cooling tower.

The size and shape of the preferred splash bars 18 and the grid 14 make proper positioning and spacing of the bars 18 in the grids 14 relatively simple based on positioning the preferred right angle lower corners 18*b* of the splash bars 18 in the preferred right angle bottom portions 16*a* of the slots 16, resulting in full horizontal coverage in the cooling tower. Since the bars 18 have the bar width $W_B$ of approximately four inches (4") or two to eight inches (2-8"), and the slots 16 have the first and second spacing $S_1$, $S_2$ of approximately five and two-thirds inches (5.66") or two and eight tenths to twelve inches (2.8-12") and the slot width $W_S$ at its widest point of the diamond of the slot 16 is approximately eight inches (8") or four to sixteen inches (4-16"), the preferred arrangement and configuration prevents water or cooling medium from falling through the tower without impacting or falling through the bars 18. In addition, the installation of the bars 18 into the grids 14 to define the splash bar hanger assembly 10 is relatively simple, particularly when compared to installing prior art splash bars into openings with exclusively horizontal and vertical wires that are narrowly spaced to support and space the splash bars. In the prior art configuration, the vertical suspension members may create horizontal gaps or vertical bypass of hot water through the splash bars and this bypass hot water results in a hotter outlet fluid in the basin at the bottom of the cooling tower, which is undesirable. In addition, the self-centering configuration of the bars 18 and slots 16 facilitate proper positioning of the bars 18 in the assembly.

An artifact of the grid 14 having the eight inch (8") slot width $W_S$ and eight inch (8") slot height $H_S$ in the substantially square or diamond-shaped slots 16 and the splash bars 18 having the bar width $W_B$ of approximately four inches (4") is that a vertical offset of the splash bars 18 along the vertical axis 20 is approximately sixty-six percent (66%), not fifty percent (50%) of the slot height $H_S$ of eight inches (8"). The "layers" of splash bars 18 are, therefore, only offset by one-third (⅓) of the vertical distance between the splash bars 18 when splash bars 18 are positioned in each of the slots 16, which is not limiting and the splash bars 18 may be otherwise positioned in the slots 16, preferably such that vertically falling droplets impact or move through at least one of the splash bars 18 when falling from a top of the cooling tower to a bottom of the cooling tower.

Figure 1:
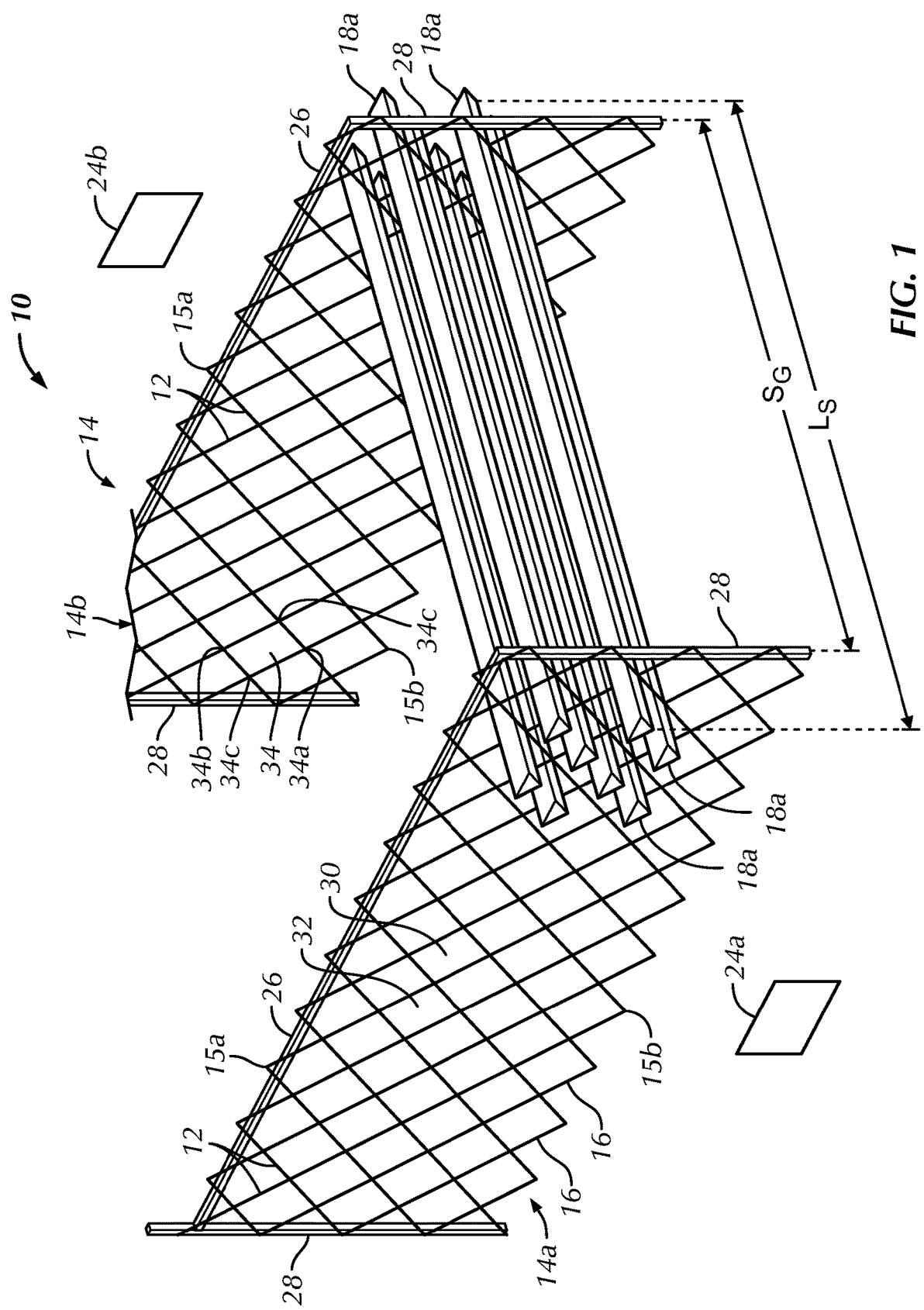
FIG. 1 is a top perspective view of a splash bar and splash bar hanger assembly in accordance with a first preferred embodiment of the present invention, wherein a plurality of splash bars are supported by the splash bar hanger.
Figure 1A:
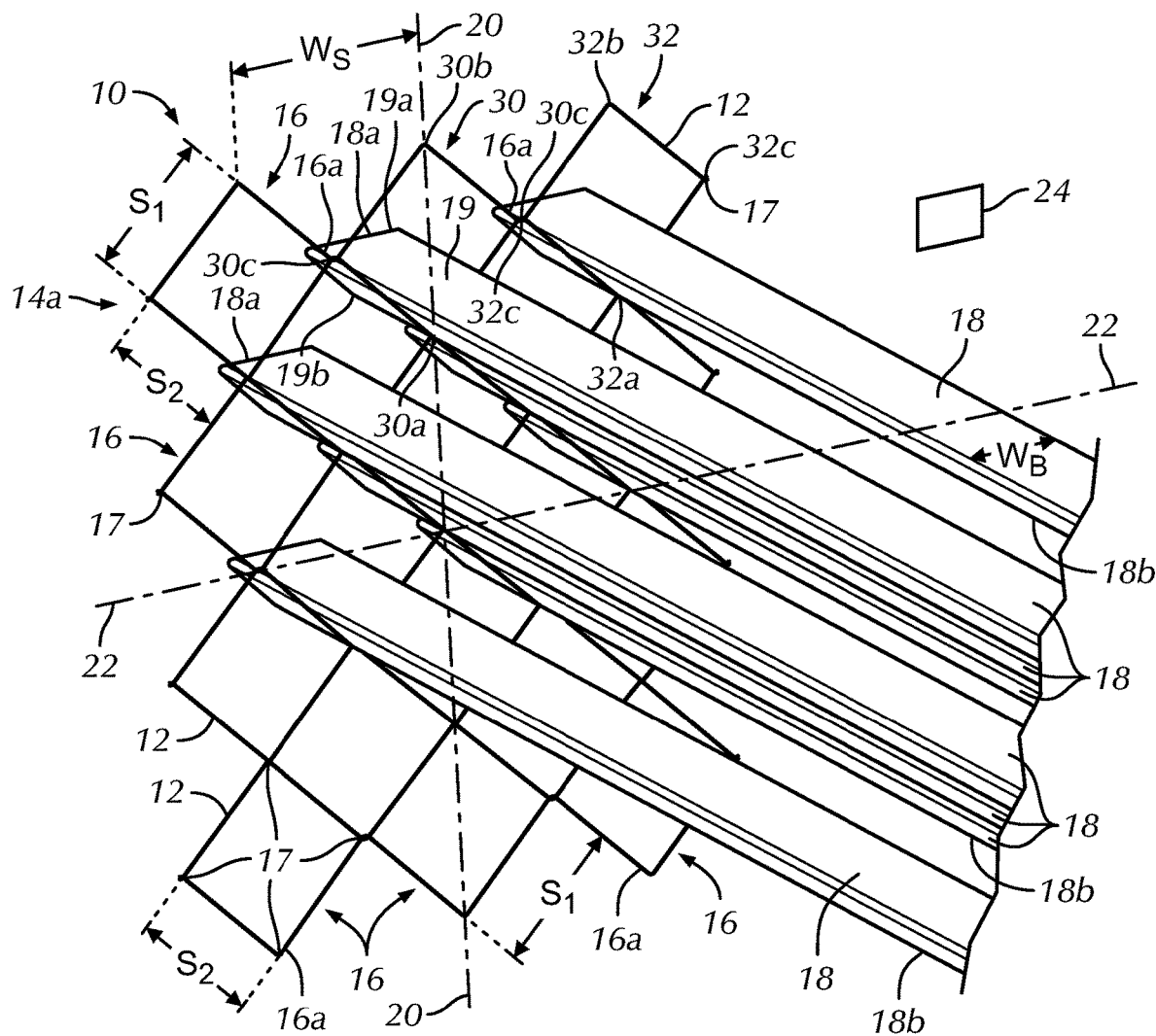
FIG. 1A is a magnified side perspective view of a portion of a first grid of the cooling tower splash bar hanger of FIG. 1, wherein end portions of a plurality of splash bars are mounted on the preferred first grid of the splash bar hanger.
Figure 2:
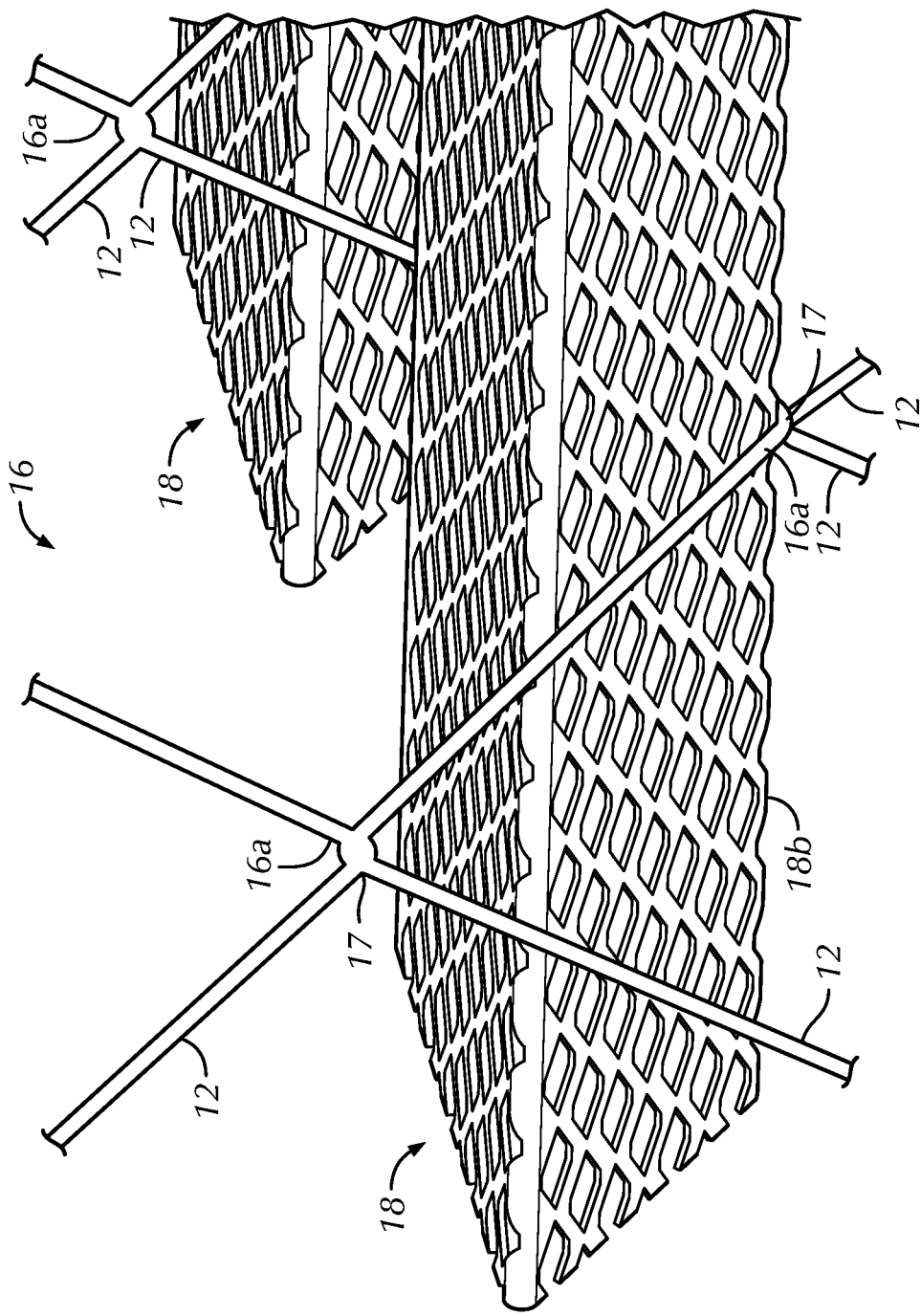
FIG. 2 is a further magnified side perspective view of a portion of the first grid of the splash bar hanger and end portions of splash bars of FIG. 1A.
Figure 3:
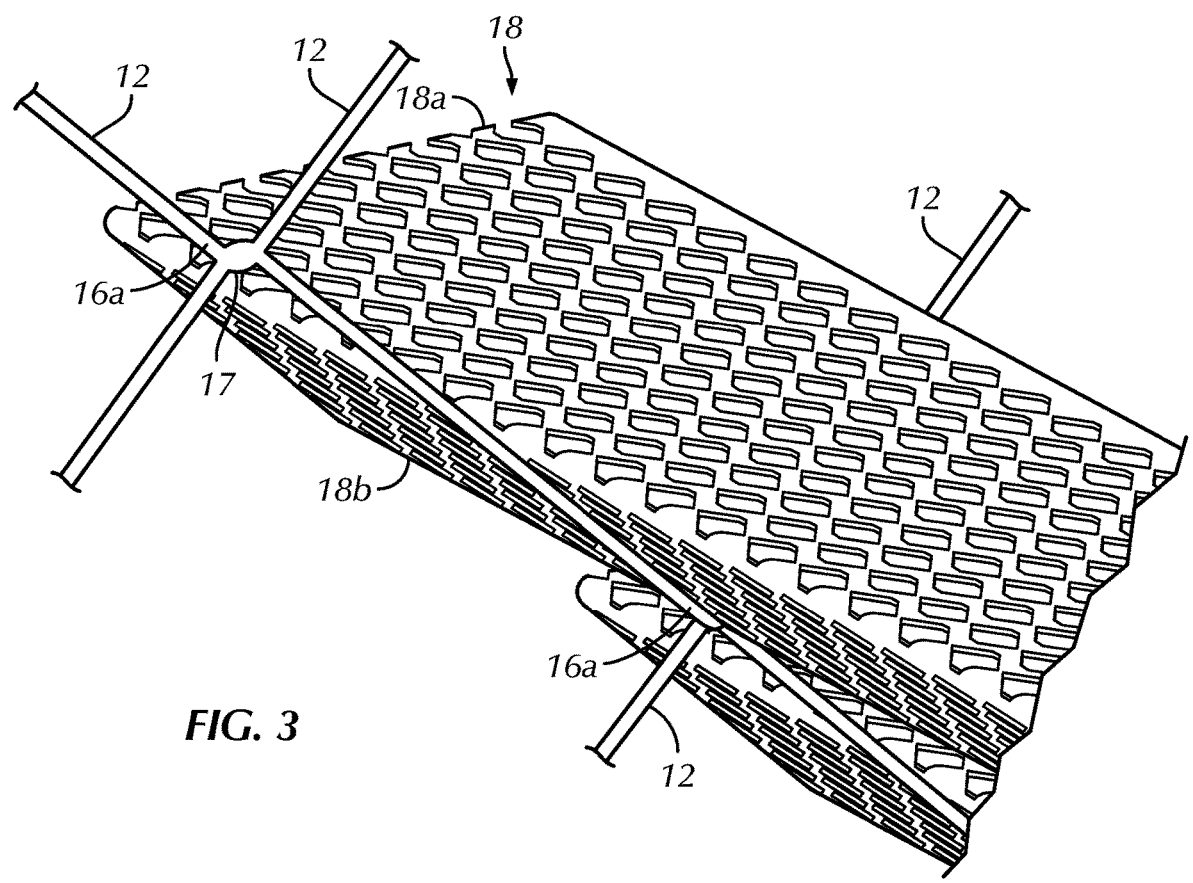
FIG. 3 is a magnified top perspective view of a portion of the first grid of the splash bar hanger and end portions of splash bars of FIG. 1.
Figure 4:
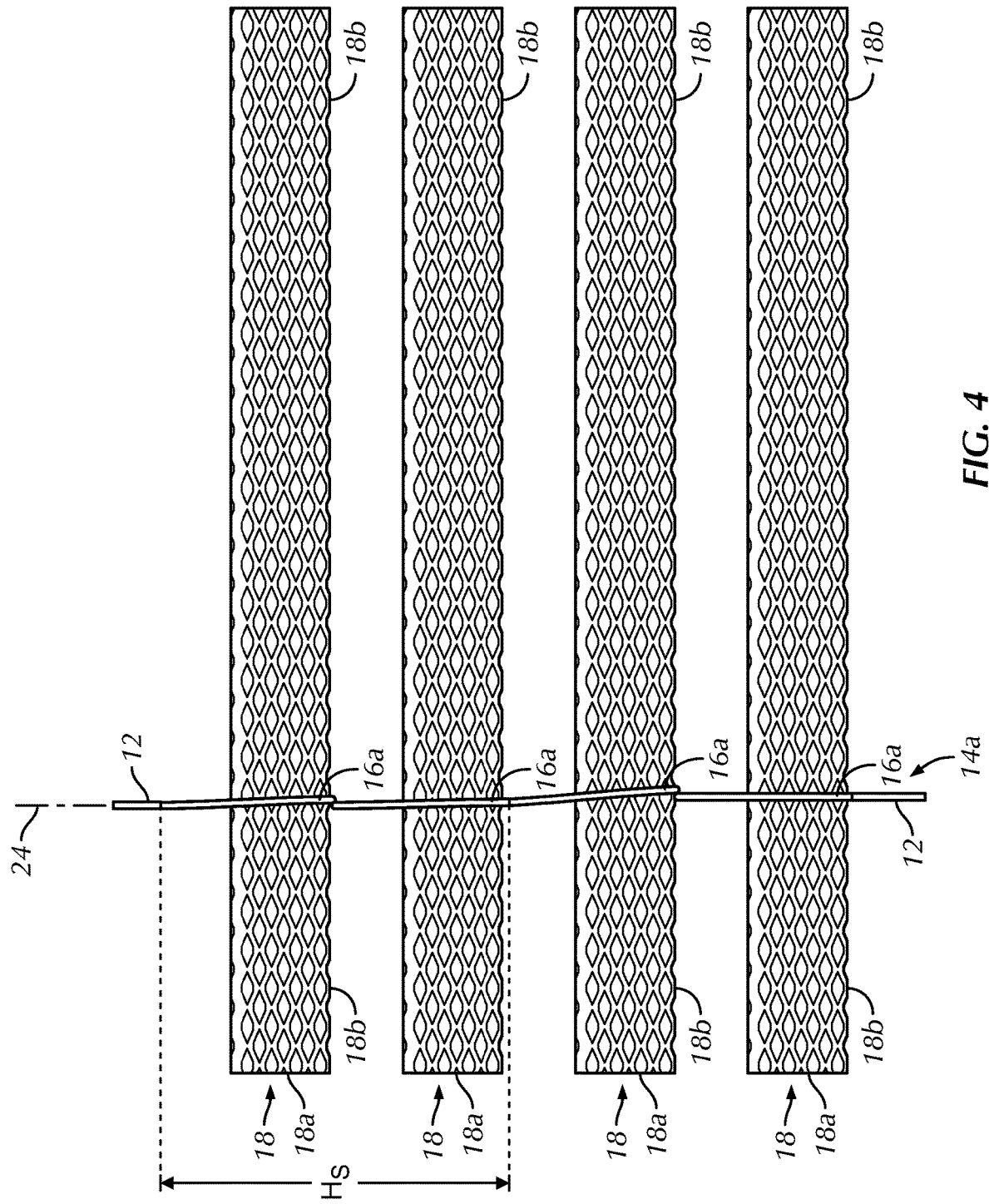
FIG. 4 is a front elevational view of a portion of the first grid of the cooling tower splash bar hanger and portions of the splash bars of FIG. 1.
Figure 5:
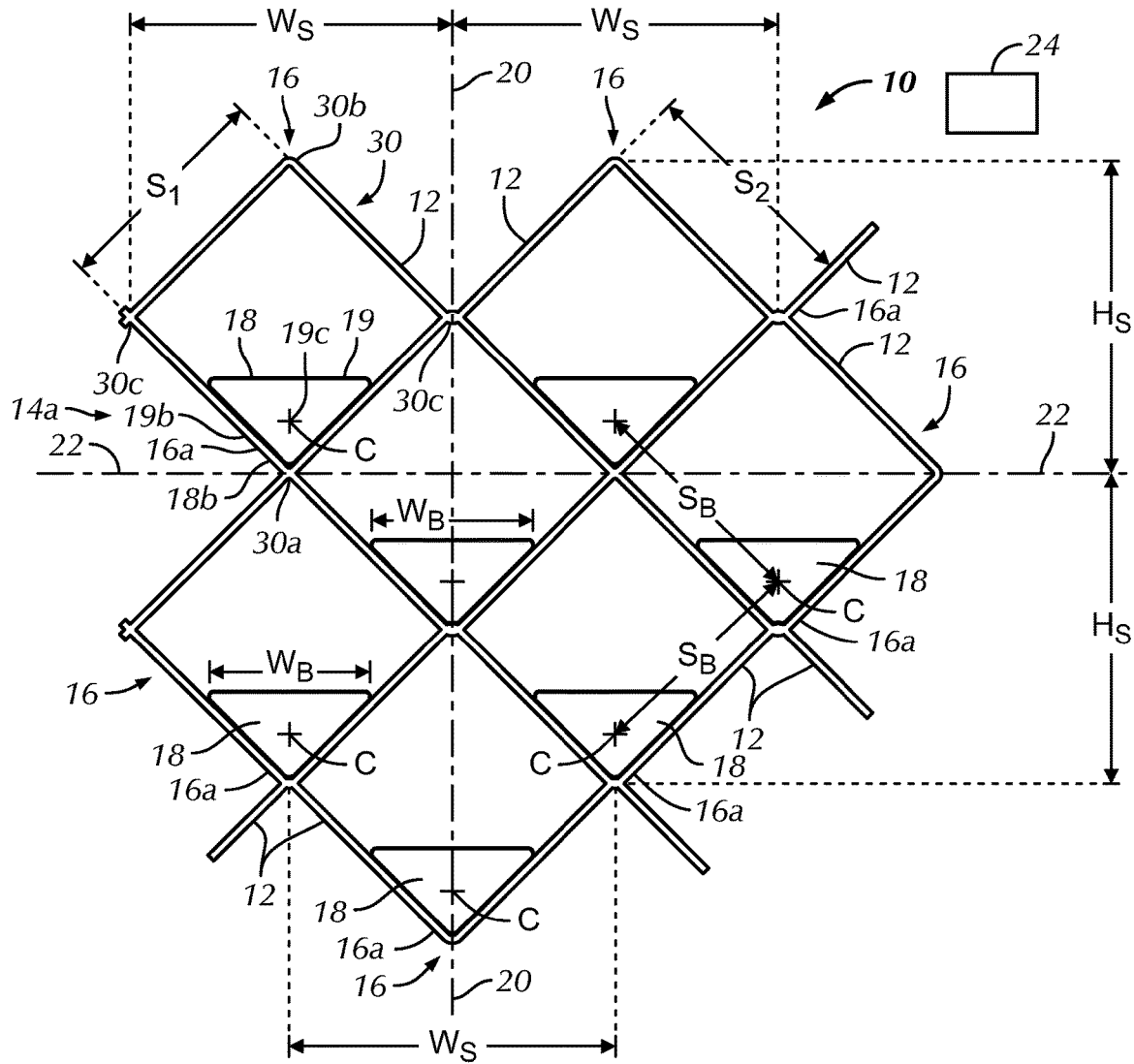
FIG. 5 is a magnified side elevational view of a portion of the first grid of the cooling tower splash guard hanger of FIG. 1 with splash bars mounted therein.
Figure 5A:
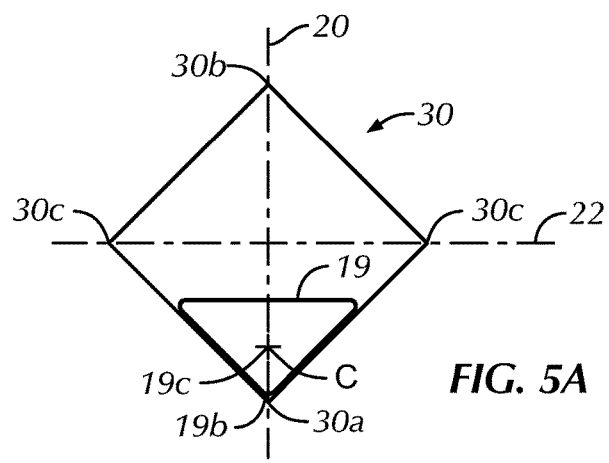
FIG. 5A is a side elevational view of a first slot of the first grid of the splash bar hanger of FIG. 1 with a splash bar mounted therein.

The design and configuration of the preferred hanger grids 14 with the relatively small diameter wires 12 accommodates relatively simple and compact storage of the grids 14 by collapsing or rolling the grids 14 into a storage configuration (not shown). The rolled grids 14 can subsequently be rolled into the storage configuration and "tied" for transport. The rolled grids 14 may then readily be positioned and unrolled into a mounted or assembled configuration (FIGS. 1-5) in the cooling tower to aid in installation. For example, grid top 15*a* of the rolled grid 14 may be positioned at a horizontal support structure 26 and fastened to the horizontal support structure 26. The rolled grid 14 may then be released to unroll into the mounted or assembled configuration. The horizontal support structure 26 may include brackets or hooks for engaging the grid top 15*a* of the rolled grids 14 and the tie may be "cut" to drop the wire hanger grid 14 or first and second grids 14*a*, 14*b* as curtains. The rolled first and second grids 14*a*, 14*b* may also be otherwise attached to the top horizontal support structure 26 and dropped as a curtain into an operating position (FIG. 1). The first and second grids 14*a*, 14*b* and intermediate grids 14 may subsequently be attached to vertical support structures 28 at their ends to secure the grids 14, 14*a*, 14*b* to the cooling tower, although the hanger grids 14, 14*a*, 14*b* are not limited to being secured to the vertical support structures 28 and are functional without vertical securement.

Since there is no welding of the wire 12 to define the grid 14, there is no degradation of the alloy or coating on the wire 12, therefore, the anti-corrosion properties of the wire 12 are not compromised during a welding process. There are no quality escapes based on the quality of the weld which cannot be inspected, absolutely by the naked eye, as potentially occurs with the prior art splash bar hangers. In addition, the grids 14, 14*a*, 14*b* are relatively simple and efficient to install and placement of the splash bars 18 within the slots 16 is instinctive for the installer or technician by sliding the preferred triangularly shaped cross-section splash bars 18 or otherwise shaped splash bars 18 into the diamond shaped slots 16, generally perpendicular to the grid planes 24, 24*a*, 24*b*. The splash bars 18 are not limited to being triangularly shaped and may have circular, oval, trapezoidal, square or other shapes that extend through the slots 16 in the cooling tower. Once installed, the splash bars 18 are positioned in the opposing slots 16 of the first and second grids 14*a*, 14*b* and in the slots 16 of the intermediate grids 14 and the shape of the preferred splash bars 18 results in positioning of the plurality of splash bars 18, such that the full horizontal cross-section of the cooling tower between first and second grids 14*a*, 14*b* is taken-up by one of the plurality splash bars 18 for impact by vertically falling water or other cooling fluid within the cooling tower.

In the first preferred embodiment, the first grid 14*a* is mounted at a first side of the cooling tower and the second grid 14*b* is mounted at a second side of the cooling tower with intermediate grids 14 mounted therebetween. The splash bar hanger assembly 10 is not limited to including both the first and second grids 14*a*, 14*b*, as the cooling tower may be configured with the first grid 14*a* at a first side of the cooling tower and a prior art grid at the opposite side of the cooling tower without significantly impacting the operation and function of the splash bar hanger assembly 10. The first grid 14*a* is preferably constructed of a first plurality of wires 12 and the second grid 14*b* is preferably constructed of a second plurality of wires 12. The second grid 14*b* defines a second plurality of slots 16 and the second plurality of slots 16 includes a third slot 34. The first grid 14*a* preferably defines a first grid plane 24*a* and the second grid 14*b* preferably defines a second grid plane 24*b* that are substantially parallel in the assembled and installed configurations. The first grid 14*a* includes the first slot 30 and the second slot 32 and the second grid 14*b* includes the third slot 34. In the first preferred embodiment, a grid spacing SG is defined between the first and second grids 14a, 14b and the first and second grid planes 24a, 24b and the splash bars 18 preferably have a splash bar length Ls greater than the grid spacing SG, such that the ends 18a of the splash bars 18 extend beyond the first and second grids 14a, 14b and the first and second grid planes 24a, 24b in the installed configuration. In the installed configuration the slots 16, 30, 32, 34 support the splash bars 18, 19 proximate the ends 18a, 19a, respectively, while the intermediate grid 14 supports intermediate portions of the splash bars 18, 19. The first slot 30 is associated with the first grid 14a, but both the first and second grids 14a, 14b have substantially the same or a similar configuration, with the plurality of slots 16 for supporting the splash bars 18 at the opposing ends 18a, 19a and intermediately along the lengths of the splash bars 18, 19, respectively. The water and air preferably flow through the cooling tower between the grid top and bottom 15a, 15b to come into contact with the splash bars 18 within the cooling tower. The water or cooling medium preferably flows or falls vertically through the splash bars 18 and grids 14, 14a, 14b from a top of the fill into a cooling basin below the splash bars 18 and the air preferably flows through the fill, generally parallel (crossflow) to the splash bars 18, but is not so limited and may flow upwardly (counterflow) through the splash bars 18, generally perpendicularly relative to the splash bars 18 or otherwise through the fill to promote heat transfer between the cooling medium and the air flow.

The second grid 14b preferably includes the third slot 34 with a third bottom portion 34a, a third top portion 34b and a pair of third side portions 34c at or near corners or peaks 17 of the third slot 34. The first slot 30 includes the first bottom portion 30a and the first top portion 30b, which include a pair of first vertical corners or opposing peaks 17 that define a first vertical axis 20 and the pair of first side portions 30 or pair of first horizontal corners or peaks 17 that define a first horizontal axis 22. The third slot 34 defines a third vertical axis 20 with a pair of third vertical corners or peaks 17, which are comprised of the third bottom portion 34a and the third top portion 34b and a third horizontal axis 22 with a pair of third horizontal corners or peaks 17, which are comprised of the pair of third side portions 34c. The second grid 14b defines a second grid plane 24b. The first grid plane 24a is substantially parallel relative to the second grid plane 24b in the first preferred embodiment and is spaced by the grid spacing SG, but is not so limited and may be otherwise arranged, as long as the splash bars 18 are positionable within the slots 16, 30, 32, 34 in the assembled and installed configurations such that the splash bars 18 extend across the horizontal space in the cooling tower, preferably generally perpendicular relative to the first and second grid planes 24a, 24b.

The third slot 34 is aligned with the first slot 30 along a first splash bar axis 19c of the first splash bar 19 in the assembled and installed configurations. Generically, the first and second grids 14a, 14b are preferably aligned such that each of the slots 16 are aligned with an opposing slot 16 along a splash bar axis 18c that extends through the geometric centers C of the respective splash bars 18. The first splash bar axis 19c and the splash bar axes 18c preferably extend generally perpendicular to the first and second grid planes 24, 24a, 24b, but are not so limited and may otherwise extend at angles relative to the grid planes 24, 24a, 24b, preferably such that the installed splash bars 18, 19 cover the horizontal space within the cooling tower when water flows between the grid top 15a and the grid bottom 15b in the assembled and installed configurations. The first and second grids 14a, 14b are configured to support end portions 18a, 19a of the splash bars 18, 19, particularly the first splash bar 19 in the first and third slots 30, 34 with the first bottom portion 30a and the third bottom portion 34a in the assembled and installed configurations. The preferred first and second grid planes 24a, 24b define the grid spacing SG, which is approximately twenty-four to sixty inches (24-60") in the first preferred embodiment and the splash bar length Ls is approximately forty-eight to two hundred sixteen inches (48-216"), such that the support ends 18a, 19a extend beyond the first and second planes 24a, 24b in the installed configuration away from the center of the cooling tower. The splash bars 18 are preferably periodically supported along their length by a plurality of spaced intermediate grids 14 between the first and second grids 14a, 14b.

Figure 6:
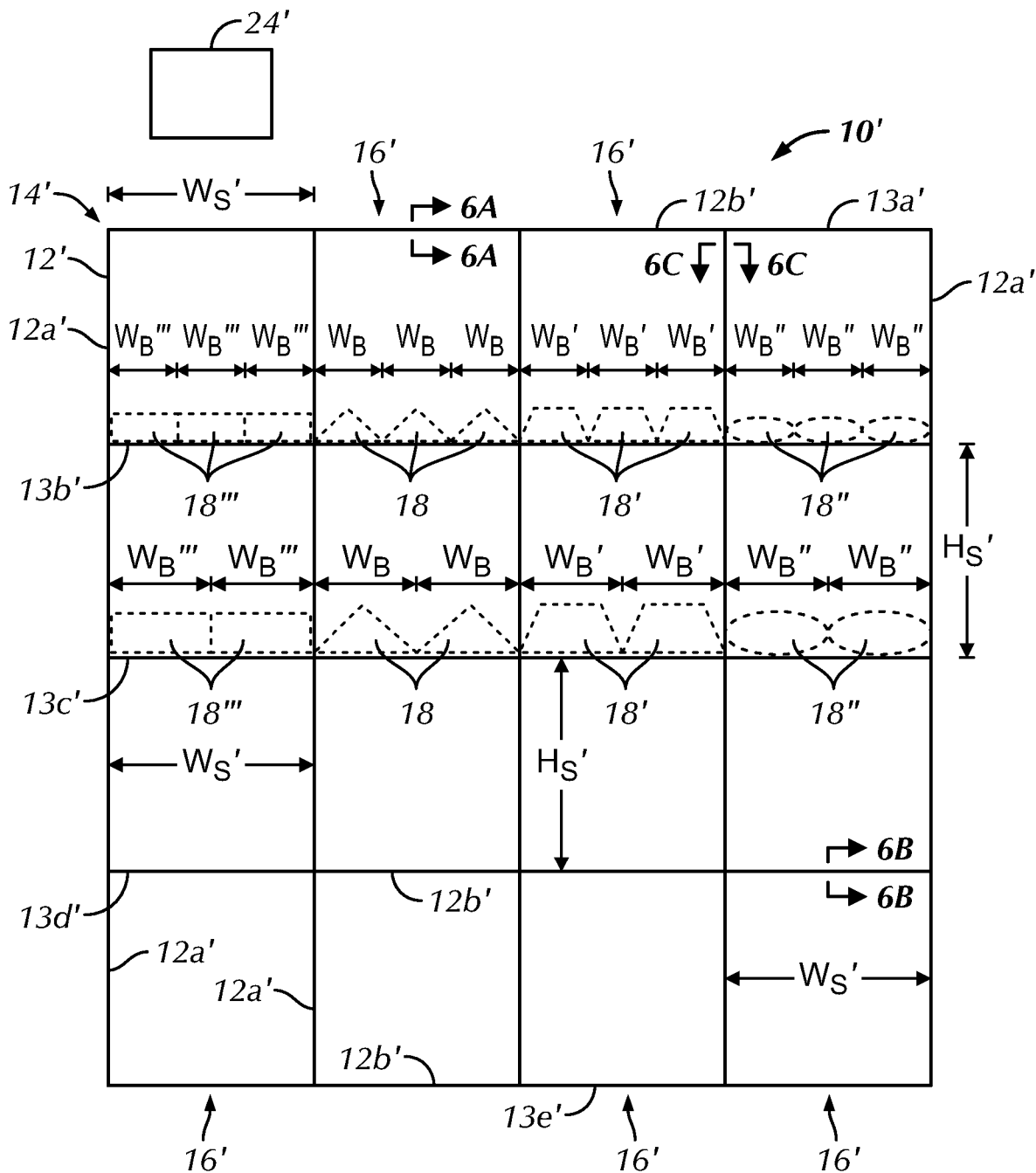
FIG. 6 is a side elevational view of a portion of a splash bar hanger in accordance with a second preferred embodiment of the present invention, wherein various splash bars are mounted to the splash bar hanger

Referring to FIG. 6, a cooling tower splash bar hanger assembly of a second preferred embodiment, generally designated 10', is configured to position the splash bars 18, 18', 18", 18'" in a cooling tower (not shown) in an installed or mounted configuration. The second preferred splash bar hanger assembly 10' has similar features when compared to the first preferred splash bar hanger assembly 10 and like reference numbers are utilized to identify and describe like features with a prime symbol (') utilized to distinguish the second preferred embodiment from the first preferred embodiment.

The splash bar hanger grids 14' of the second preferred embodiment have a plurality of slots 16' defined by wires 12', wherein each of the plurality of slots 16' is generally rectangular, although are not so limited and may be square, rhombus or otherwise sized and shaped for supporting the splash bars 18, 18', 18", 18'". In addition, each of the second preferred slots 16' of the plurality of slots 16' includes generally vertical wires 12a' and generally horizontal wires 12b'. The wires 12a', 12b' are preferably spaced such that each of the plurality of slots 16' accommodate a plurality of the splash bars 18' in the mounted configuration, such as two to four (2-4) splash bars 18'. The splash bars 18, 18', 18", 18'" preferably have a closed cross-sectional shape, such as a splash bar 18 having a right isosceles triangle shape, a splash bar 18' having a trapezoid shape, a splash bar 18" having an oval shape, a splash bar 18'" having a rectangular shape or another shape that has a closed central cavity, is able to take on the general size and shape of the splash bars 18, 18', 18", 18'", withstand the normal operating conditions of the splash bars 18, 18', 18", 18'" and perform the preferred functions of the splash bars 18, 18', 18", 18'". The splash bars 18, 18', 18", 18'" of the second preferred embodiment are not limited to having the closed cross-sectional shapes shown in FIG. 6 or closed cross-sectional shapes and may be otherwise designed and configured, such as being comprised of flat plates, bars, T-shaped cross-sectional bars, U-shaped cross-sectional bars or otherwise sized and shaped for insertion into the slots 16' of the second preferred embodiment. The splash bars 18, 18', 18", 18'" are preferably sized and configured for positioning in the plurality of slots 16' in a side-by-side configuration with at least two splash bars 18, 18', 18", 18'" positioned in each one of the slots 16'. The preferred wires 12' may have generally circular cross-sections, but are not so limited and may have other shapes and configurations, such as square, T-shaped, I-beam shaped, U-shape, N-shape, Z-shape, oval, relatively flat, rectangular or rectangular-shaped cross-sections or other structural shapes depending on loading or other factors, as long as the shapes are able to perform the preferred functions of the wires 12' and withstand the normal operating conditions of the wires 12'. The wires 12' may particularly have shapes other than generally circular when formed from polymeric materials, such as rectangularly shaped wires 12' formed in an injection molded grid 14'.

As a non-limiting example, each of the slots 16' may have a slot height $H_S'$ of eight inches (8") and a slot width $W_S'$ of eight inches (8") and the splash bars 18' may be configured for positioning in pairs in the slots 16' or three (3) splash bars 18' may be configured for positioning side-by-side in the slots 16' with no or minimal gaps between the adjacent splash bars 18' and the vertical wires 12a' to generally cover the horizontal cross-sections within the fill to prevent cooling medium from falling through the cooling tower without impacting or falling through one of the splash bars 18, 18', 18", 18'". As another non-limiting example, the splash bars 18, 18', 18", 18'" may have bar widths $W_B$, $W_B'$, $W_B''$, $W_B'''$ of four inches (4") when two (2) of the splash bars 18, 18', 18", 18'" are positioned side-by-side in each of the eight inch (8") slots 16', two and two-thirds inches (2⅔") when three (3) of the splash bars 18, 18', 18", 18'" are positioned side-by-side in each of the eight inch (8") slots 16' or may otherwise be sized such that the number (n) of splash bars 18, 18', 18", 18'" times the bar widths $W_B$, $W_B'$, $W_B''$, $W_B'''$ generally equals the slot width $W_S'$ (n*($W_B$, $W_B'$, $W_B''$ or $W_B'''$)=$W_S'$). The slot heights $H_S'$ and a slot widths $W_S'$ are not limited to being eight inches (8") and may range from approximately four inches to thirty-two inches (4-32") or more. In addition, the slot heights $H_S'$ and a slot widths $W_S'$ are not limited to being equal to each other and are not necessarily consistent at each level of the slots 16' or relative to adjacent slots 16'. For example, a first slot height $H_S'$ defined between first and second horizontal wires 13a', 13b' may be different than a second slot height $H_S'$ defined between second and third horizontal wires 13b', 13c'. Similarly, the slot widths $W_S'$ may vary across the width of the hanger grid 14' of the second preferred embodiment. As a non-limiting example, the first slot height $H_S'$ may be one foot (1') and the second slot height $H_S'$ may be two feet (2').

Referring to FIGS. 1-6, the hanger grids 14' are configured to have a greater slot width $W_S'$ for each of the slots 16', specifically with respect to the bar width $W_B$, $W_B'$, $W_B''$, $W_B'''$ of the preferred splash bars 18, 18', 18", 18'" that are inserted into the slots 16'. The slot widths $W_S'$ of the second preferred slots 16' are preferably approximately four to thirty-two inches (4-32"), but are not so limited and may be otherwise sized and configured. The splash bars 18, 18', 18", 18'" are preferably configured to cover the full slot widths $W_S$, $W_S'$ of the horizontal area in the cooling tower such that droplets falling through the fill generally impact or fall through at least one of the splash bars 18, 18', 18", 18'" during their fall through the fill. The slotted prior art splash bars 5 are designed more for cascading water from one level of splash bars 5 to adjacent lower levels of splash bars 5. The overlap created by the slots in the prior art bars 5 that extend past the vertical wires 2 is an effort to prevent direct bypass of the water in the tower or create a continuous stream that is not impacted by the bars 5. The exemplary 4-inch slot widths $W_S$, $W_S'$ and vertical offset or slot height $H_S$, $H_S'$ in arrangements are generally an artifact of the legacy extruded and punched splash bars 5. Water droplets produced from the splash bars 18, 18', 18", 18'" is better distributed when compared to the prior art splash bars 5 and the airside pressure drop is also more distributed essentially eliminating the need for the offset. The mesh splash bars 18, 18', 18", 18'" of the second preferred embodiment do not provide an overlap due to their more vertically oriented side wall construction. Bypass is not a significant driver of the design of the mesh splash bars 18, 18', 18", 18'", because the water flows to the lowest most portions of the splash bars 18, 18', 18", 18'", which for the preferred splash bars 18, 18', 18", 18'", the lowest point is offset from the side edges of the splash bars 18, 18', 18", 18'". The generally rectangular-shaped cross-section splash bar 18'", due to the manufacturing process, has an upwardly-shaped arch on the bottom of the splash bar 18'" and a downwardly-shaped arch on the top creating a generally hourglass profile. The drops formed at the bottom of this rectangular-shaped cross-section preferred splash bar 18'" tend to migrate on the continuous transverse members to the bottom corner edges of the hourglass shape.

The preferred mesh splash bars 18, 18', 18", 18'" that allow water or other cooling medium to pass through its members so as not to blind off underneath the bars 18, 18', 18", 18'", thereby increases the thermal transfer efficiency from the droplets that form and fall from the bars 18, 18', 18", 18'". The second preferred splash bar hangers or grids 14' that have the larger or generally wider slots 16' accommodate simpler installation of the splash bars 18, 18', 18", 18'" onto the hanger grids 14'. Both the diamond-shaped splash bar hanger grids 14, 14a, 14b of the first preferred embodiment and the vertical/horizontal splash bar hanger grids 14' of the second preferred embodiment may provide the larger openings or slots 16, 16' to reduce the labor costs of the installation. The diamond-shaped wire hanger grid 14 of the first preferred embodiment is self-centering when inserting the right isosceles triangle cross-sectional shaped splash bars 18 into the slots 16 and is not constrained by the vertical wires 12a' of the grids 14' of the second preferred embodiment, so the bars 18 can vary in width to overlap. The splash bars 18, 18', 18", 18'" can be triangular, trapezoidal, oval, rectangular or otherwise shaped in cross-section and can vary in size based on practical design constraints, preferably resulting in at least one of the legs of the shape of the splash bars 18, 18', 18", 18'" being positioned generally horizontally, as is shown in FIG. 6 for each of the splash bars 18, 18', 18", 18'". Similarly, the vertical/horizontal wire hanger grid 14' of the second preferred embodiment with the vertical and horizontal wires 12a', 12b' can accept splash bars 18, 18', 18", 18'" of various shapes so long as the shape can be installed in the slots 16' of the wire hanger grid 14' and function to provide thermal mass transfer. For instance, the triangular and trapezoidal splash bars 18, 18' can be installed with their generally flat side or leg positioned in contact with the horizontal cross wires 12b' of the grids 14'. Alternatively, the oval-shaped splash bar 18" can also be used with the second preferred grid 14', which may deform to the flat shape of the horizontal wire 12b' where the horizontal wire 12b' contacts the bar 18". A wider splash bar 18, 18', 18", 18'" can be used in conjunction with the second prefer hanger grid 14' that can accept the multiple splash bars 18, 18', 18", 18'" to be placed laterally proximate in the installation. For instance, configuring the wire grid slot 16' to have a slot width $W_S'$ of twelve inches (12") would accept three (3) splash bars 18, 18', 18", 18'" having splash bar widths $W_B$, $W_B'$, $W_B''$, $W_B'''$ of four inches (4") or two (2) splash bars 18, 18', 18", 18'" having splash bar widths $W_B$, $W_B'$, $W_B''$, $W_B'''$ of six inch (6"). The wider splash bars 18, 18', 18", 18'" would span larger distances due to the efficiencies of the larger geometry.

Referring to FIGS. 1-6 and, specifically, FIG. 6, the preferred splash bars 18, 18', 18", 18'" may be mounted in the second preferred hanger grid 14' that includes horizontal and vertical wires 12a', 12b', thereby defining the slots or support windows 16'. The support slots 16' are preferably larger than prior art grids (FIGS. 1PA-3PA), specifically with respect to a size ratio between the slot widths $W_S'$ and the splash bar widths $W_B$, $W_B'$, $W_B''$, $W_B'''$, having slot widths $W_S'$ of four to twenty-four inches (4-24"). The generally oversized support slots 16' are configured for side-by-side stacking of the preferred splash bars 18, 18', 18", 18''' on the horizontal wires 12a' and between adjacent vertical wires 12b'.

In operation, the second preferred splash bar hanger assembly 10' includes the relatively large support slots 16', particularly when comparing the splash bar widths $W_B$, $W_B'$, $W_B''$, $W_B'''$ of the splash bars 18, 18', 18", 18''' to the slot widths $W_S'$ of the slots or support windows 16'. For example, the splash bars 18, 18', 18", 18''' may have a splash bar width $W_B$, $W_B'$, $W_B''$, $W_B'''$ of two to six inches (2-6") and the support slots 16' may have a slot width $W_S'$ of approximately four to twenty-four inches (4-24"), wherein a size ratio of the splash bar width $W_B$, $W_B'$, $W_B''$, $W_B'''$ relative to the slot width $W_S'$ is approximately two or three to one, but is not so limited and may be greater than two or three to one and may alternately be slightly smaller than two to one, such that the splash bars 18, 18', 18", 18''' are friction or force fit into the support windows 16' in the mounted configuration. For example, as shown in FIG. 6, the preferred splash bars 18, 18', 18", 18''' may have a splash bar width $W_B$, $W_B'$, $W_B''$, $W_B'''$ of approximately four inches (4") or slightly larger and the support slots 16' may have a slot width $W_S'$ of twelve inches (12") (top row) resulting in an approximately three to one size ratio, the splash bars 18, 18', 18", 18''' may have a splash bar width $W_B$, $W_B'$, $W_B''$, $W_B'''$ of two inches (2") or slightly larger and the support slots 16' may have a slot width $W_S'$ of four inches (4") (lower row) resulting in an approximately two to one size ratio or other configurations may be incorporated, as would be apparent to one having ordinary skill in the art based on the present disclosure. Two or three splash bars 18, 18', 18", 18''' may, therefore, be positioned in a side-by-side relationship in each support slot 16' with the overall width of the splash bars 18, 18', 18", 18''' being approximately the same or slightly larger than the slot width $W_S'$ such that the splash bars 18, 18', 18", 18''' are friction or force fit into the slots 16' in the mounted configuration. The preferred friction or force fit of the splash bars 18, 18', 18", 18''' into the slots 16' facilitates retention of the splash bars 18, 18', 18", 18''' in the slots 16' in the mounted configuration, particularly during operation of the cooling tower when air and cooling medium are flowing through the splash bars 18, 18', 18", 18'''. The force fit or friction fit facilitates retention of the splash bars 18, 18', 18", 18''' in the slots 16', potentially without alternative retention mechanisms. The force and friction fit of the splash bars 18, 18', 18", 18''' in the slots 16' also facilitates generally full horizontal coverage of the space within the cooling tower such that nearly all of the cooling medium impacts at least one of the splash bars 18, 18', 18", 18''' as the cooling medium flows from the top of the cooling tower into the lower basin. Positioning multiple splash bars 18, 18', 18", 18''' in each of the slots 16' results in a more forgiving and generally quicker installation, as the support slots 16' are relatively large compared to the splash bar widths $W_B$, $W_B'$, $W_B''$, $W_B'''$ of the splash bars 18, 18', 18", 18''' and a technician or installer is readily able to urge the splash bars 18, 18', 18", 18''' into the support slots 16' during assembly and installation and to force fit or friction fit the splash bars 18, 18', 18", 18''' into the slots 16' during assembly.

Figure 6A:
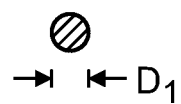
FIG. 6A is a cross-sectional view of a first wire of the splash bar hanger of FIG. 6, taken along line 6A-6A of FIG. 6.
Figure 6B:
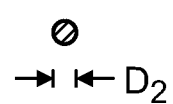
FIG. 6B is a cross-sectional view of a second wire of the splash bar hanger of FIG. 6, taken along line 6B-6B of FIG. 6.
Figure 6C:
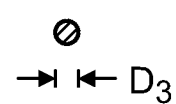
FIG. 6C is a cross-sectional view of a vertical wire of the splash bar hanger of FIG. 6, taken along line 6C-6C of FIG. 6.

Referring to FIGS. 6-6C the grid 14' of the second preferred splash bar hanger assembly 10' may be constructed of welded or stamped wires 12', wherein the vertical and horizontal wires 12a', 12b' are welded or stamped together at their intersections. The wires 12' may have a substantially cylindrical shape, as shown in FIGS. 6A-6C and may alternatively be comprised of other structural members that are able to perform the preferred functions of the wires 12' and withstand the normal operating conditions of the wires 12'. The horizontal wires 12a' of the second preferred embodiment include a first horizontal wire 13a', a second horizontal wire 13b', a third horizontal wire 13c', a fourth horizontal wire 13d' and a fifth horizontal wire 13e'. The splash bars 18, 18', 18", 18''' may be mounted on any of the first, second, third fourth or fifth horizontal wires 13a', 13b', 13c', 13d', 13d', but are preferably mounted on the second, third, fourth and fifth horizontal wires 13b', 13c', 13d', 13d' in the slots 16' between the vertical wires 12a' with the first horizontal wire 13a' secured to the gird top 15a.

In the second preferred embodiment, the first horizontal wire 13a' has a first wire gauge or first diameter $D_1$ and the second, third, fourth and fifth horizontal wires 13b', 13c', 13d', 13d' have a second wire gauge or second diameter $D_2$. The first diameter $D_1$ is greater than the second diameter $D_2$ in the second preferred embodiment, but is not so limited. In addition, the second, third, fourth and fifth horizontal wires 13b', 13c', 13d', 13d' are not limited to all having the second wire gauge or the second diameter $D_2$ and may have differing sizes and diameters or may be constructed in differing shapes compared to each other. The larger first diameter $D_1$ compared to the second diameter $D_2$ increases the weld cross-section at the intersections of the first horizontal wire 13a' and the vertical wires 12a' to increase strength at these joints where the greatest accumulated loads are carried by the grid 14' supporting the splash bar hanger assembly 10'. The vertical wires 12a' preferably have a third diameter $D_3$ that is less than the first diameter $D_1$, and substantially the same or slightly smaller than the second diameter $D_2$. The vertical wires 12a' carry an increasing load from the bottom to the top where the vertical wires 12a' intersect and are connected to the first horizontal wire 13a' based on the increasing weight loading of multiple layers of the splash bar hanger assembly 10'. The increased weld sizes at the intersections of the first wire 13a' and the vertical wires 12a' also preferably increase the section modulus of the weld joints, thereby improving the strength and stiffness of the joints. The splash bar grids 14' of the second preferred embodiment are not limited to having the greater first gauge or diameter $D_1$ of the first wire 13a' compared to the second diameter $D_2$ of the second horizontal wire 13b' and each of the wires 13a', 13b', 13c', 13d', 13e' may have increasingly greater gauge from the bottom to the top of the assembly 10' to progressively increase the strength and stiffness of the assembly 10' from the bottom toward the top of the assembly 10' with the weld joints of higher horizontal wires 13a', 13b', 13c', 13d', 13e' and the vertical wires 12a' bearing increasingly greater loads. In addition, the vertical wires 12a' are not limited to having the third diameter $D_3$ less than the first diameter $D_1$ and substantially equal of slightly smaller than the second diameter, $D_2$ and may be designed and configured to have the same, smaller, tapering or greater diameters and may be constructed of a different material than the horizontal wires 13a', 13b', 13c', 13d', 13e', which may impact the required sizes of the first, second and third diameters $D_1$, $D_2$, $D_3$. The wires 13a', 13b', 13c', 13d', 13e' are not limited to having a generally cylindrical shape with the circular cross-section described herein and may have alternative configurations and cross-sectional shapes, such as square, rectangular, octagonal, oval, T-shaped, N-shaped, Z-shaped, I-beam or other shapes that facilitate function of the splash bar hanger assemblies 10' and that are able to withstand the normal operating conditions of the wires 13a', 13b', 13c', 13d', 13e'.

Figure 7:
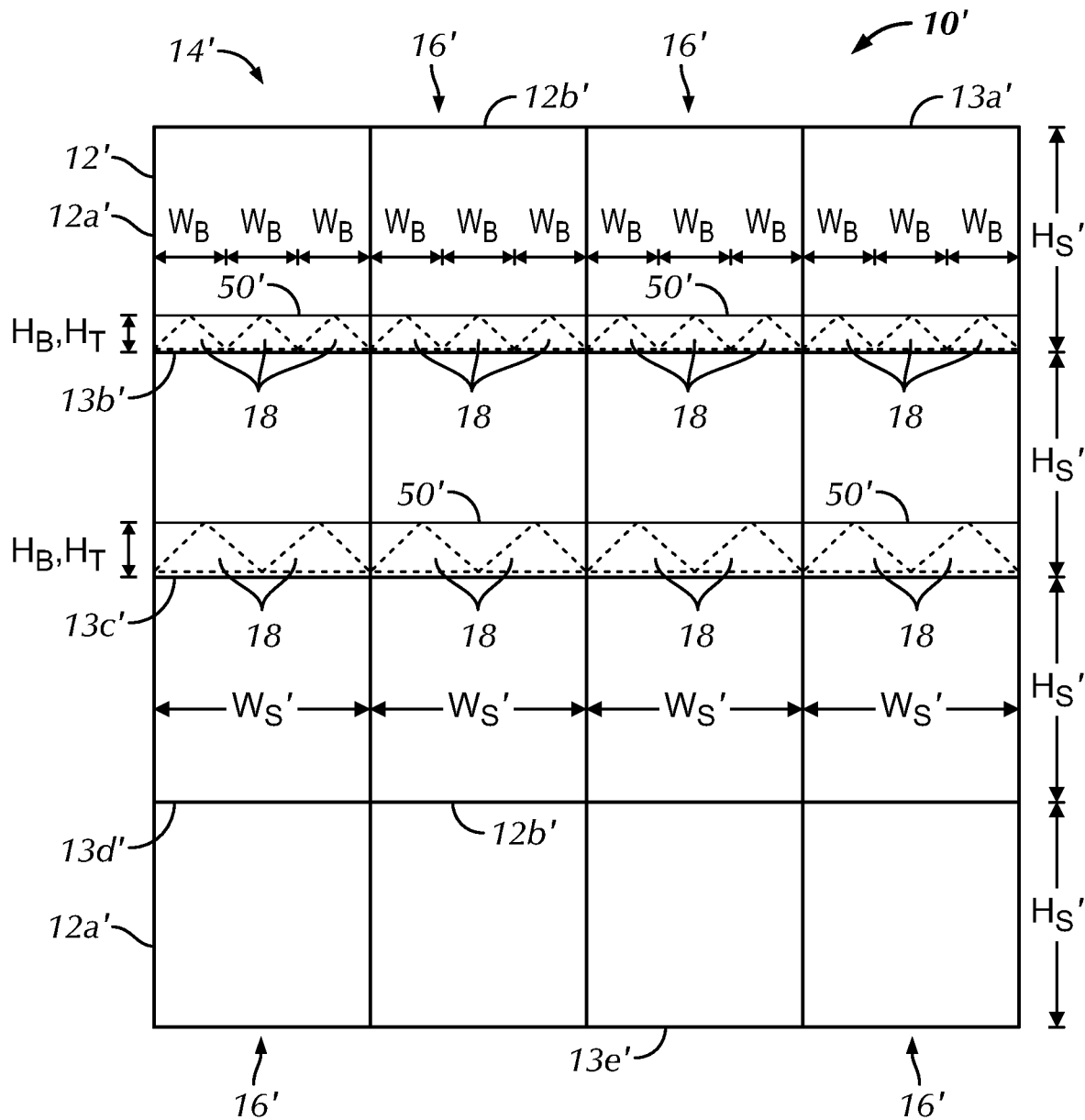
FIG. 7 is a side elevational view of a portion of a splash bar hanger in accordance with an alternative configuration of the splash bar hanger of FIG. 6 with a plurality of generally triangular-shaped cross-section splash bars mounted therein.
Figure 7A:
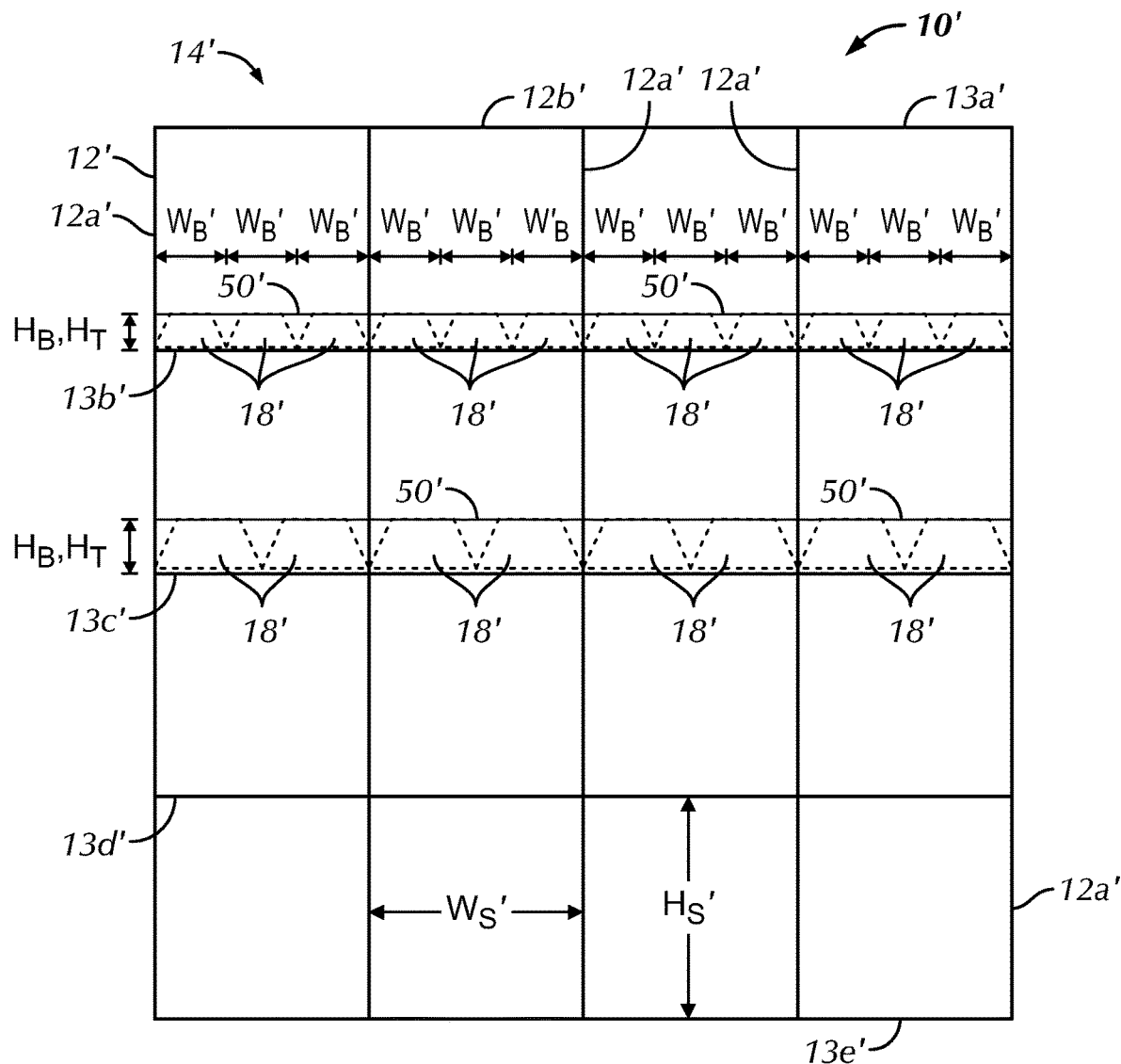
FIG. 7A is a side elevational view of a portion of a splash bar hanger in accordance with the alternative configuration of the splash bar hanger of FIG. 7 with a plurality of generally trapezoidal-shaped cross-section splash bars mounted therein, preferably isosceles trapezoid-shaped cross-section splash bars mounted therein.
Figure 7B:
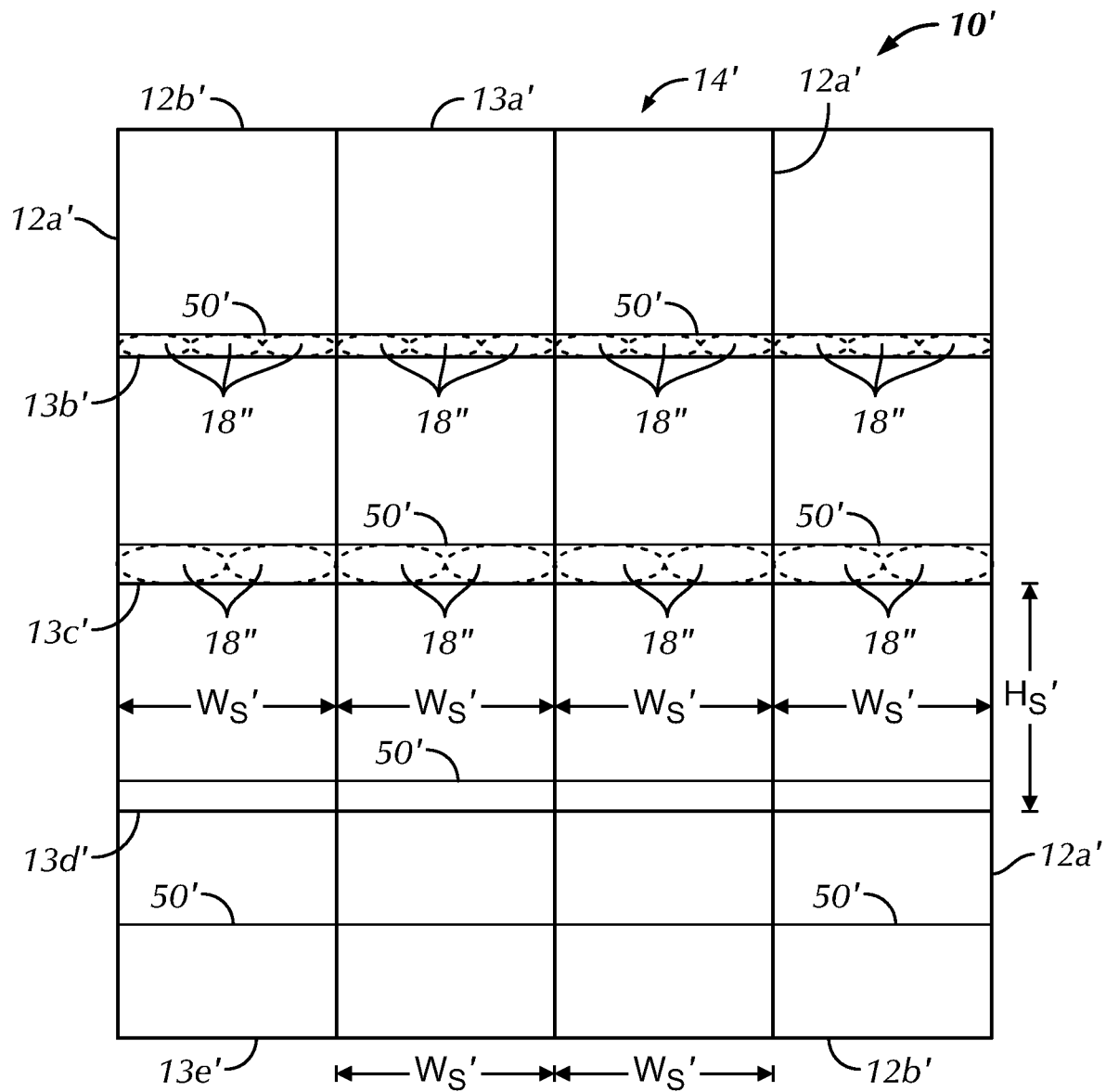
FIG. 7B is a side elevational view of a portion of a splash bar hanger in accordance with the alternative configuration of the splash bar hanger of FIG. 7 with a plurality of generally oval-shaped cross-section splash bars mounted therein.

Referring to FIGS. 7-7B, in an alternative second preferred embodiment, the hanger grids 14' include a top support or retention member 50' that is incorporated into any one of the slots 16', but preferably extends across a horizontal row of the slots 16' from a first side to a second side of the hanger grids 14'. The top support or retention member 50' may be incorporated into any of the hanger grids 14', including the end and intermediate grids 14' and may be included in only select ones of the slots 16', all of the slots 16' in a horizontal row or all of the slots 16' in the grids 14'. The top support 50' may be fixed or movable relative to each of the second, third, fourth and fifth horizontal wires 13a', 13b', 13c', 13d', 13e', respectively, to provide vertical support as a securement/retention mechanism to stabilize or secure the splash bars 18, 18', 18'', 18''' in the respective slots 16'. The top support 50' preferably supports tops of the splash bars 18, 18', 18'', 18''' that are mounted in the slots 16' with the splash bars 18, 18', 18'', 18''' supported by the lower horizontal wires 13a', 13b', 13c', 13d', 13e' associated with the respective slot 16'. The top supports 50' preferably extend generally parallel to the second, third, fourth and fifth horizontal wires 13a', 13b', 13c', 13d', 13e' and are spaced from the second, third, fourth and fifth horizontal wires 13a', 13b', 13c', 13d', 13e' at a top support height $H_T$, which is substantially the same as a splash bar height $H_B$ or slightly less than the splash bar height $H_B$ in an installed configuration. The top support 50' provides vertical support to the installed splash bars 18, 18', 18'', 18''' to limit vertical movement, vibration or other motion of the splash bars 18, 18', 18'', 18''' during use. The top support 50' may be movable vertically relative to the respective second, third, fourth and fifth horizontal wires 13a', 13b', 13c', 13d', 13e' to accommodate splash bars 18, 18', 18'', 18''' having differing splash bar heights $H_B$, may be selectively mountable to hooks or other mounting mechanisms at different top support heights $H_T$, may be positioned without mounting to the grids 14', may be fixed to the grids 14' to accommodate splash bars 18, 18', 18'', 18''' having a predetermined splash bar height $H_B$, may be pivotable relative to the grids 14' between an open position where the splash bars 18, 18', 18'', 18''' are mounted onto the grids 14' to a closed position where the splash bars 18, 18', 18'', 18''' are retained by the top support 50' or may be otherwise designed and configured to limit vertical movement of the splash bars 18, 18', 18'', 18''' during use in the installed configuration. The top support 50' is preferably comprised of a generally cylindrical member, bar or wire that is welded to the vertical wires 12a' associated with the respective slot 16' of the top support 50', although the top support 50' is not so limited and may be otherwise designed and configured, as is described herein. The top support 50' is preferably constructed of the same or similar material to the associated vertical and horizontal wires 12a', 13a', 13b', 13c', 13d', 13e', but is not so limited and may be otherwise designed and configured.

Figure 8:
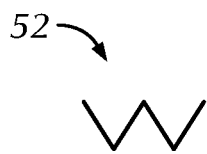
FIG. 8 is a side elevational view of a clip that may be utilized with the preferred splash bar hangers.

In operation, the alternative second preferred grids 14' are positioned in the cooling tower and the splash bars 18, 18', 18'', 18''' are positioned on the second, third, fourth and fifth horizontal wires 13b', 13c', 13d', 13e' in the installed configuration. The splash bars 18, 18', 18'', 18''' are force fit or moved into the space between the second, third, fourth and fifth horizontal wires 13a', 13b', 13c', 13d', 13e' and the top supports 50' to secure the splash bars 18, 18', 18'', 18''' in the installed configuration. In a preferred configuration and method, the top supports or retention members 50' are fixed to a first end grid 14' at a side of the splash bar hanger assembly 10' from which the splash bars 18, 18', 18'', 18''' are installed into the cooling tower. The splash bars 18, 18', 18'', 18''' are inserted into the slots 16' above the top supports or retention members 50' and through additional slots 16' in intermediate and opposing end grids 14'. The splash bars 18, 18', 18'', 18''' are urged fully through the slot 16' in the first end grid 14' and then urged into the space between the respective top support or retention member 50' and the respective second, third, fourth or fifth horizontal wire 13b', 13c', 13d', 13e'. The splash bars 18, 18', 18'', 18''' may be force fit into the space resulting in some deformation of the splash bars 18, 18', 18'', 18''', may be inserted into the space wherein the splash bar heights $H_B$ is substantially the same as the top support height $H_T$ or the top support height $H_T$ may be slightly greater than the splash bar heights $H_B$, although each configuration preferably, generally retains the splash bars 18, 18', 18'', 18''' in the respective slots 16', at least in a vertical direction. Referring to FIG. 8, the splash bars 18, 18', 18'', 18''' may also be secured to the grids 14 splash bars 18, 18', 18'', 18''' by a clip 52 or other securement mechanism that engages the splash bars 18, 18', 18'', 18''' and the respective wires 12a', 12b' or top supports 50' of the grids 14', preferably by applying a clamping force between the splash bars 18, 18', 18'', 18''' and the respective wires 12a', 12b' or top supports 50'. The clip 52 preferably extends through openings or holes in the splash bars 18, 18', 18'', 18''' and around the respective wires 12a', 12b' or top supports 50' to secure the splash bars 18, 18', 18'', 18''' to the grids 14'.

Referring to FIGS. 7-8, the top support 50' is positioned above the splash bars 18, 18', 18'', 18''' in the installed configuration and provides retention (preferably an interference fit) proximate to the top of the splash bars 18, 18', 18'', 18''' to secure the splash bars 18, 18', 18'', 18''' in the splash bar hanger assembly 10' in the installed configuration. The grid 14' with the top support 50' is preferably positioned at one of the ends of the splash bar hanger assembly 10', but is not so limited and may be utilized with any of the grids 14' of the splash bar hanger assembly 10'. The splash bars 18, 18', 18'', 18''' are preferably inserted through the slot 16' above the top support 50' and urged completely through the slot 16', then pulled back into position under the top support 50'. The clip 52 may be utilized to quickly engage the top of the splash bars to provide positive locking of the members in place, although not required.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the preferred invention as defined by the appended claims.

We claim:

1. A cooling tower splash bar hanger assembly for mounting in a cooling tower to cool a cooling medium, the splash bar hanger assembly comprising:

a grid comprised of a plurality of wires defining a plurality of slots, the plurality of wires including a plurality of vertical wires and a plurality of horizontal wires, the plurality of vertical wires including a first vertical wire and a second vertical wire, the plurality of slots including a first slot, the first slot defining a first slot width between the first vertical wire and the second vertical wire;

a first splash bar defining a first bar width, the first splash bar configured for positioning in the first slot in a mounted configuration supported by one of the plurality of horizontal wires; and a second splash bar defining a second bar width, the second splash bar supported by the one of the plurality of horizontal wires in the mounted configuration, the first slot width being greater than the first bar width and the second bar width, the first slot width and the first bar width defining a size ratio, the size ratio being one of approximately two to one and greater than two to one.

2. The splash bar hanger assembly of claim 1, wherein the plurality of horizontal wires includes a first horizontal wire and a second horizontal wire, the first horizontal wire is a top wire and the second horizontal wire is positioned below the first horizontal wire in the grid.

3. The splash bar hanger assembly of claim 2, wherein the first horizontal wire has a first diameter and the second horizontal wire has a second diameter, the first diameter being greater than the second diameter.

4. The splash bar hanger assembly of claim 3, wherein the first diameter is sixteen hundredths of an inch (0.160") and the second diameter is one hundred twenty-eight thousandths of an inch (0.128").

5. The splash bar hanger assembly of claim 1, wherein the size ratio is less than two to one such that the first and second splash bars are interference fit into the first slot in the mounted configuration.

6. The splash bar hanger assembly of claim 1, wherein a first vertical wire of the plurality of vertical wires has a third diameter and a second horizontal wire of the plurality of horizontal wires has a second diameter, the third diameter being substantially the same as the second diameter.

7. A cooling tower splash bar hanger for supporting splash bars in a portion of a cooling tower through which air and water flow, the splash bar hanger comprising:

a grid comprised of wires defining a plurality of slots, the wires including a plurality of generally horizontal wires and a plurality of generally vertical wires, the plurality of generally horizontal wires including a first generally horizontal wire and a second generally horizontal wire, a first slot defined between the first generally horizontal wire and the second generally horizontal wire, the grid including a top support extending generally parallel to the first and second generally horizontal wires, the top support spaced from the second generally horizontal wire at a top support height, the top support height is configured to be substantially the same as a splash bar height of a splash bar that is supported by the grid, the first generally horizontal wire spaced from the second generally horizontal wire at a slot height, the slot height being greater than the top support height.

8. The splash bar hanger of claim 7, wherein the top support is fixed to at least two of the plurality of generally vertical wires.

9. The splash bar hanger of claim 7, wherein the top support is movable, at least generally vertically relative to the second generally horizontal wire.

10. The splash bar hanger of claim 7, wherein the top support height is approximately one and one-half to three inches.

11. The splash bar hanger of claim 7, wherein the slot height is approximately four to sixteen inches.

12. The splash bar hanger of claim 7, wherein the first slot is further defined by a first vertical wire and a second vertical wire of the plurality of generally vertical wires, the first and second vertical wires defining a slot width, the slot width is approximately four to sixteen inches.

13. The splash bar hanger of claim 7, wherein the plurality of generally horizontal and vertical wires have a generally circular cross-section and the top support is comprised of a generally cylindrical member.

14. The splash bar hanger of claim 7, wherein the grid includes a clip configured to secure a splash bar to the grid in an installed configuration.

15. The splash bar hanger of claim 7, wherein the top support is welded to at least two of the plurality of generally vertical wires.

16. The splash bar hanger of claim 7, wherein the top support, the pluralities of generally vertical and horizontal wires are constructed of the same material.

17. The splash bar hanger of claim 16, wherein the material is comprised of one of a metallic material and a polymeric material.

* * * * *